United States Patent [19]
Haraguchi et al.

[11] Patent Number: 4,711,212
[45] Date of Patent: Dec. 8, 1987

[54] ANTI-KNOCKING IN INTERNAL COMBUSTION ENGINE

[75] Inventors: Hiroshi Haraguchi, Kariya; Koji Sakakibara, Hekinan, both of Japan

[73] Assignee: Nippondenso Co., Ltd., Kariya, Japan

[21] Appl. No.: 933,611

[22] Filed: Nov. 21, 1986

[30] Foreign Application Priority Data

| Nov. 26, 1985 | [JP] | Japan | 60-266989 |
| Dec. 4, 1985 | [JP] | Japan | 60-273097 |
| Jun. 12, 1986 | [JP] | Japan | 61-137152 |
| Jul. 31, 1986 | [JP] | Japan | 61-181795 |

[51] Int. Cl.$^4$ ............................................. F02P 5/145
[52] U.S. Cl. .................................... 123/425; 123/435
[58] Field of Search .................. 123/425, 435; 73/35

[56] References Cited

U.S. PATENT DOCUMENTS

| 4,442,814 | 4/1984 | Kubozuka | 123/425 |
| 4,549,513 | 10/1985 | Dovaud et al. | 123/435 X |
| 4,557,236 | 12/1985 | Showalter | 123/435 |
| 4,617,895 | 10/1986 | Sakakibara et al. | 123/425 |
| 4,667,637 | 5/1987 | Staerzl | 123/425 X |

FOREIGN PATENT DOCUMENTS

| 0066661 | 5/1980 | Japan | 123/425 |
| 0180766 | 10/1983 | Japan | 123/425 |

Primary Examiner—Willis R. Wolfe, Jr.
Attorney, Agent, or Firm—Cushman, Darby & Cushman

[57] ABSTRACT

Disclosed is an anti-knocking control system for controlling an internal combustion engine to prevent knocking in accordance with a knocking condition detected by a knock detecting apparatus on the basis of a distribution pattern of knock magnitude values derived from the output signal of a knock sensor. The knock detection apparatus is arranged to derive a knock magnitude value from the output signal of the knock sensor generated within a predetermined engine rotational angle at an interval thereby obtaining a plurality of knock magnitude values, determine a pattern of distribution of the plurality of knock magnitude values on the basis of the results of comparison between the frequency that the knock magnitude value exceeds an upper threshold value and the frequency that the knock magnitude value goes below a lower threshold value, and detect a knocking condition of the engine in accordance with the determined distribution pattern. The lower threshold value is a value corresponding to a cumulative point lower than the cumulative 50% point of a cumulative distribution and the upper threshold value is a value corresponding to a cumulative point higher than the cumulative 50% point of the cumulative distribution.

21 Claims, 30 Drawing Figures

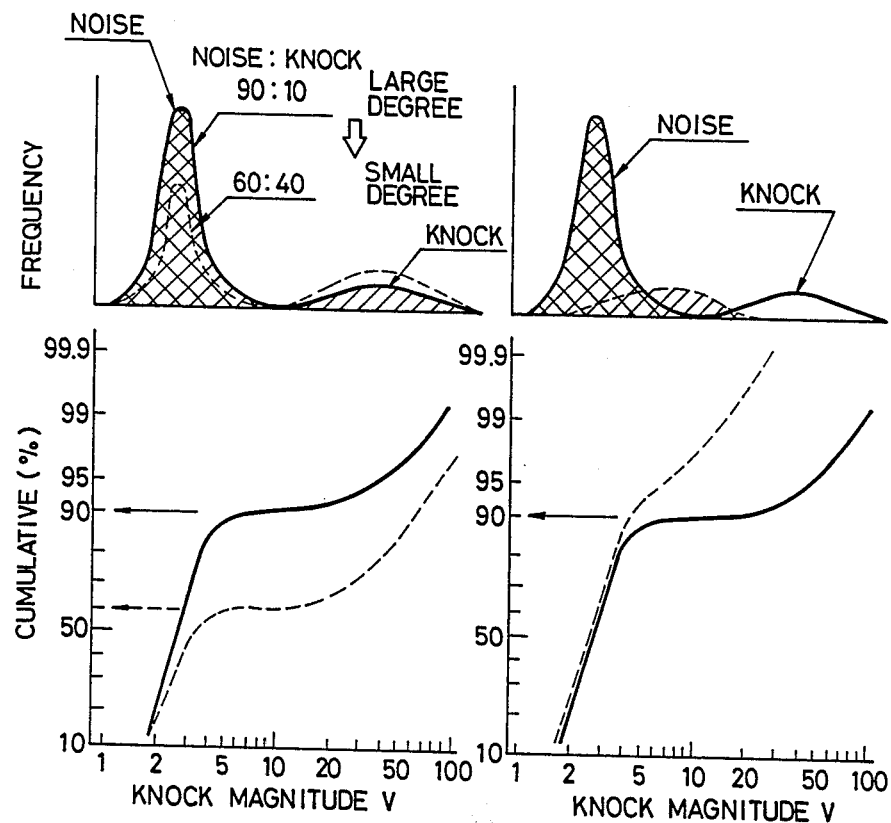

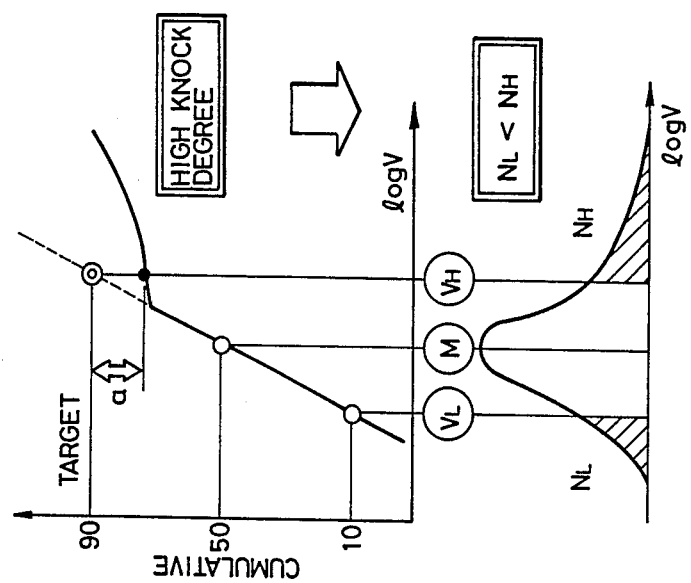
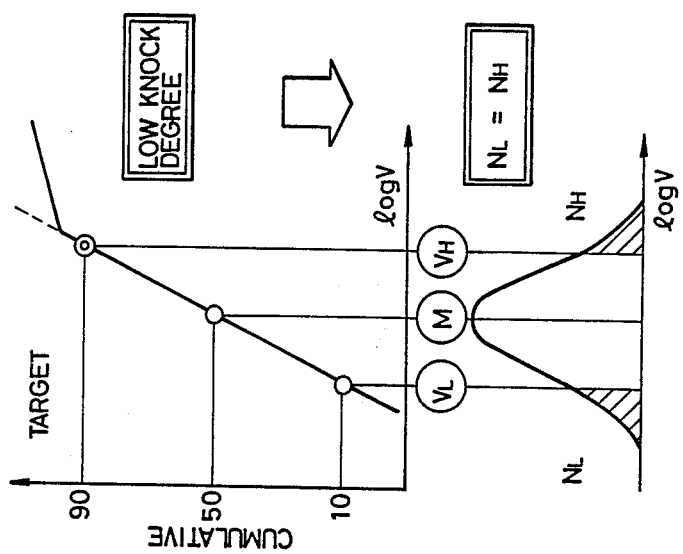

ANTI-KNOCKING IN INTERNAL COMBUSTION ENGINE

BACKGROUND OF THE INVENTION

The present invention relates generally to an anti-knocking control system, more particularly to a system for detecting knock-occuring conditions of an internal combustion engine and thereby controlling the internal combustion engine to prevent the occurrence of knocking in accordance with the results of detection of the knock-occuring conditions.

Generally, an anti-knock control system for use in an internal combustion engine is known as a means for optimally controlling the ignition timing of the engine in accordance with an output signal of a knock sensor sensing the vibrations of the engine with a view to improving the output of the engine concurrently with fuel consumption. An important problem in anti-knock controlling art relates to the need for a knock sensor which provides an accurate detection of engine knocking conditions.

In order to meet the requirements for manufacturing cost and reliability there is currently employed a knock sensor of the type wherein the detection is made with respect to the vibrations of an internal combustion engine. Such a knock sensor would suffer from deterioration of signal-to-noise ratio (S/N ratio) due to the occurrence of mechanical engine vibrations resulting from a high speed operation of the engine, resulting in difficulty of a precise knock detection upon a high speed travelling of a motor vehicle. One known approach to resolution of the affection of mechanical engine vibrations under the high speed operating conditions of the engine is to use knock sensors arranged to sense the knocking of the engine on the basis of the pressure variations or the combustion light in engine cylinders.

However, these prior knock sensors do not still produce satisfactory results for meeting the requirements in terms of accurate detections of engine knock, because it is impossible for these knock sensors, for example, to resolve the problems arising in connection with the variations of output characteristics of the knock sensors owing to secular change and fabrication tolerance and the variations of vibration transfer characteristics of engines due to passage of time and engine equation.

Therefore, attempts to avoid the problems noted above have been hitherto, the techniques being disclosed in U.S. patent application Ser. No. 735,108, filed on May 17, 1985, now U.S. Pat. No. 4,617,895, and U.S. patent application Ser. No. 891,165, filed on July 31, 1986, both assigned to the assignee of this patent application. Such techniques involve determining the presence of engine knocking in accordance with the pattern of a distribution of logarithmic transformation values of the maximum values or predetermined magnitude values of signals obtained from a knock sensor within a predetermined interval. However, a further improvement would be required from the viewpoint of reliability in detection of knocking condition and anti-knocking control and simplification in construction.

SUMMARY OF THE INVENTION

The present invention has been developed in order to eliminate the above-mentioned drawbacks inherent to the conventional anti-knock control systems employed for motor vehicles.

It is therefore an object of the present invention to provide a new knock detecting system which is capable of accurately detecting an engine knocking condition irrespective of secular change of a knock sensor, equation of engines, and so on, and to provide an improved anti-knock control system which is capable of optimally controlling a knock-controlling factor such as ignition timing of the engine in accordance with the results of the detection made by the knock detecting system.

With these and other objects which will be become apparent as the description proceeds, an anti-knocking control system according to the present invention is arranged to control an internal combustion engine to prevent knocking in accordance with a knocking condition detected by a knock detecting apparatus on the basis of a distribution pattern of knock magnitude values derived from the output signal of a knock sensor. The knock detection apparatus comprises a knock sensor for outputting a signal in response to the vibrations in said engine, means for deriving a knock magnitude value from the output signal of the knock sensor generated within a predetermined engine rotational angle at an interval thereby obtaining a plurality of knock magnitude values, means for determining a pattern of distribution of the plurality of the knock magnitude values on the basis of the results of comparison between the frequency that the knock magnitude value exceeds an upper threshold value and the frequency that the knock magnitude value goes below a lower threshold value, and means for detecting a knocking condition of the engine in accordance with the determined distribution pattern.

The lower threshold value is a value corresponding to a cumulative point lower than the cumulative 50% point of a cumulative distribution and the upper threshold value is a value corresponding to a cumulative point higher than the cululative 50% point of the cululative distribution. The knock detection apparatus further comprising means for estimating a value corresponding to the cumulative 50% point by successively comparing the knock magnitude value with a basic value and increasing or decreasing the basic value by a predetermined value in accordance with the results of the comparison.

The lower and upper threshold values $V_L$ and $V_H$ are set with respect to the estimated value $V_M$ so that $V_M/V_L$ is substantially equal to $V_H/V_M$ or the lower and upper threshold values $V_L$ and $V_H$ are set with respect to the estimated value $V_M$ so that $V_M/V_L$ is slightly smaller than $V_H/V_M$.

The knock magnitude value is a maximum value of the knock sensor signal produced within the predetermined engine rotational angle, an integrated value obtained by rectifying and integrating the output signal of the knock sensor within the predetermined engine rotational angle, the number or integrated value of pulse trains obtained by comparing the output signal of the knock sensor, or a root-mean-square value of the output signal of the knock sensor.

BRIEF DESCRIPTION OF THE DRAWINGS

The object and features of the present invention will become more readily apparent from the following detailed description of the preferred embodiments taken in conjunction with the accompanying drawings in which:

FIG. 5A shows frequency distribution patterns and cumulative frequency distribution patterns obtained with respect to a knock magnitude value with S/N ratio being very high;

FIG. 5B shows a frequency distribution pattern and a cumulative frequency distribution pattern obtained with respect to the knock magnitude value with S/N ratio being very low and a frequency distribution pattern and a cumulative frequency distribution pattern obtained when the S/N ratio is high;

FIG. 6A shows a cumulative distribution of log V formed on a logarithmic normal probability paper and the corresponding frequency distribution in the condition that the knocking degree is less than a control target degree;

FIG. 6B shows a cumulative distribution of log V and the corresponding frequency distribution in the condition that the knocking degree is higher than the control target degree;

DETAILED DESCRIPTION OF THE INVENTION

Prior to description of arrangements of a knock-detecting system and an anti-knocking control system according to the present invention, the technical basis will be first described with reference to FIGS. 1A through 6.

Figure 1A:
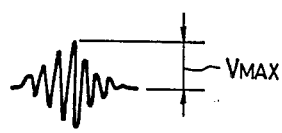
FIG. 1A is a graphic illustration of knock component of the output signal of a knock sensor obtained in response to the vibrations of an internal combustion engine.
Figure 1B:
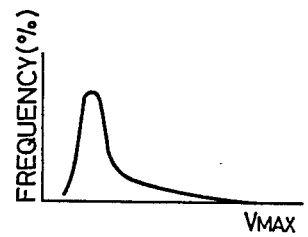
FIG. 1B shows a frequency distribution patterned with respect to the maximum values of FIG. 1A signal sampled in a plurality of combustion cycles.
Figure 1C:
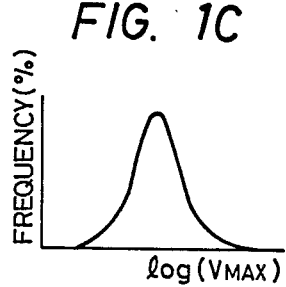
FIG. 1C shows a frequency distribution pattern obtained by sampling the maximum values in the absence of knocking of engine.
Figure 1D:
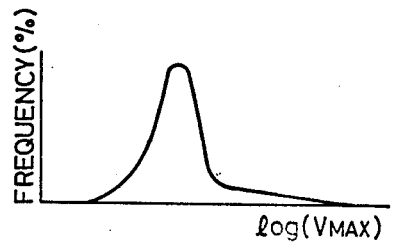
FIG. 1D illustrates a frequency distribution pattern obtained by sampling the maximum values in the presence of knocking of the engine.

FIG. 1A is a graphic illustration of the output signal of a knock sensor with frequency components of 6 to 9 kHz obtained in response to the vibrations of an internal combustion engine and FIG. 1B shows a frequency distribution patterned with respect to the maximum values Vmax of FIG. 1A signal sampled within an interval of combustion of the engine (for example, 10° to 90° ATDC) over multi-combustion cycles. On the other hand, FIGS. 1C and 1D respectively illustrate frequency distributions patterned with respect to logarithmic transformation values of the maximum values Vmax. Of these figures, FIG. 1C shows a frequency distribution pattern obtained by sampling the maximum values Vmax in the absence of knocking of the engine, assuming a normal distribution, and FIG. 1D shows a frequency distribution pattern obtained by sampling the maximum values Vmax in the presence of the knocking, resulting in no normal distribution. Therefore, it is possible to determining the presence or absence of knocking in the engine in accordance with the frequency distribution pattern of logarithmic transformation values of the maximum values Vmax.

Subsequently, a description will be made using logarithmic normal probability paper for a better understanding.

Figure 2A:
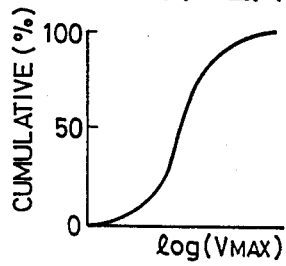
FIG. 2A is an illustration of a cumulative frequency distribution obtained when a frequency distribution assumes the normal distribution.

Generally, if a frequency distribution assumes the normal distribution, the cumulative frequency distribution, as shown in FIG. 2A, has a S-shaped curvature configuration whose point of inflection is the cumulative 50% point. The normal probability paper has a scale established such that the plotted line corresponding to the S-shaped curvature becomes in the form of a straight line as indicated by numeral (1) in FIG. 2B. Here, if the characteristic value is logarithmic value, the normal probability paper is so called logarithmic normal probability paper.

A brief description of the normal probability paper will be hereinbelow made, but a detailed description will be omitted becuase the normal probability paper is well known in the art.

A feature of the normal probability paper is that the scale of cumulative frequency in the axis of ordinate is graduated such that the interval of the scale marks symmetrically gradually becomes greater in opposite directions with respect to the 50% point. For example, the separation between 70% point mark and 60% point mark is greater than that of 60% and 50% point marks and the distance between α% and 50% point marks is equal to the distance between (100−α)% and 50% point marks. Another feature of the normal probability paper is that the slope (gradient) of a straight line formed by plotted on the paper corresponds to the inverse number (1/σ) of a standard deviation σ. This means that a greater slope angle of the line with respect to the axis of abscissas results in a distribution with a greater variance.

Figure 2B:
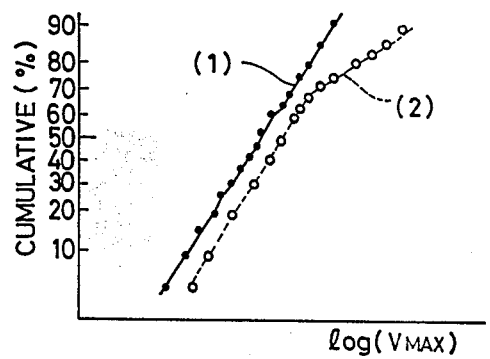
FIG. 2B is a graphic illustration of logarithmic distributions formed on a logarithmic normal probability paper.

When the maximum values Vmax of the output signal of a knock sensor are plotted in the absense of a knocking occurrence, the distribution is in the form of a straight line as indicated by (1) in FIG. 2B, resulting in a logarithmic normal distribution. On the other hand, when the knocking is occurring with a certain frequency, that is, when the output signal of the knock sensor includes knock components in a given proportion, the distribution presents a configuration having two straight lines with different slope angles as indicated by (2) in FIG. 2B. In other words, the distribution (2) comprises two logarithmic normal distribution, one being formed in response to a relatively low output and having small variance and aother being formed in response to a relatively high output and having large variance.

The present invention is further based on the fact that it is possible to accurately detecting knocking conditions of an internal combustion engine on the basis of an amount or value other than the maximum value of the output signal of a knock sensor which represents the knock vibration magnitude.

The following is examples of values V other than the maximum value Vmax which can present a distribution approximating a logarithmic normal distribution. The values V as well as the maximum value Vmax are respectively a value representing the magnitude of knock and will be hereinafter referred to as knock magnitude value.

The first is the integrated value obtained by rectifying and integrating the vibration output at a predetermined interval (for example, 10° to 90° ATDC). This value represents an average vibration output of the cycle or an integrated value of vibration output of the cycle, on the basis of the change of time constant of an integrator. The average vibration output and the integrated value respectively correspond to the magnitude of vibration in the cycle.

The second is the number or integrated value of the pulse trains obtained by comparing a vibration output in a predetermined interval with a threshold level, for example, which is set to be slightly greater than the central value of vibration. The number of the pulse trains and the integrated value of the pulse trains also correspond to a vibration magnitude in the cycle. These values slightly have a problem in terms of accuracy because the variation range is limited as compared with the range for the maximum value, while there is an advantage in that the treatment is simple.

The third is the effective value (RMS value) of vibration output in a predetermined interval. Similarly, this root-mean-square value corresponds to the magnitude of vibration in the cycle. The RMS value can be expressed by the following equation when the vibration level at a time t is X(t) and the time length of the predetermined interval is T.

$$RMS \text{ value} = \sqrt{\int X(t)^2 \, dt/T}$$

Accordingly, it will be understood that the distribution of each of these values V corresponding to the vibration magnitude presents a substantially logarithmic normal distribution under the condition of no knocking. For example, the value V can approximate the maximum value Vmax as $V = a \cdot (Vmax)^n$ where a and n are an optional real number, resulting in $\log V = \log a + n \log Vmax$. Therefore, log V as well as log Vmax offers a normal distribution, that is, the value V presents a logarithmic normal distribution.

Next, a discription will be made with respect to the variation of the distribution occurred in connection with the presence and absence of the knocking.

Figure 3:
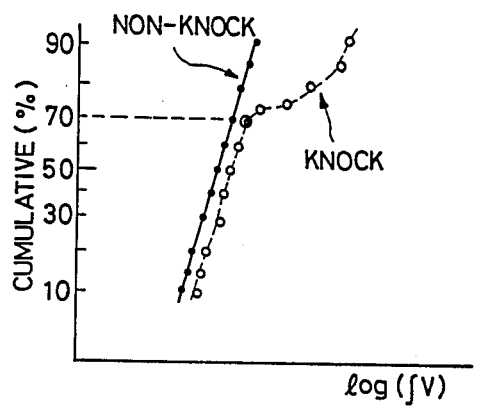
FIG. 3 is a graphic illustration of cumulative distribution patterns formed by plotting, a logarithmic normal probability paper, integrated values obtained by rectifying and integrating the output of a knock sensor.

FIG. 3 is a graphic illustration of distribution patterns of the integrated values V described above as the first example, the integrated values being derived from the output signal of an internal pressure sensor provided in a cylinder of an internal combustion engine.

Figure 4:
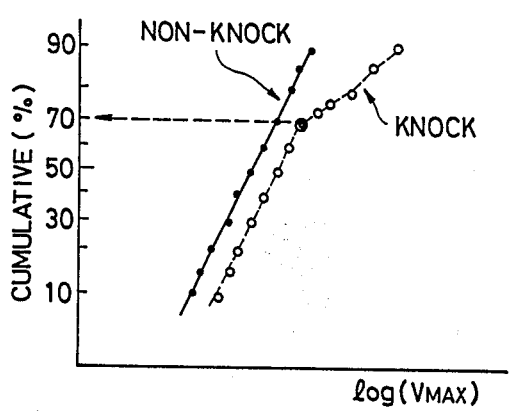
FIG. 4 is a graphic illustration of distribution patterns formed by plotting, a logarithmic normal probability paper, the maximum values sampled from the vibrations of the engine.

Only a frequency component (6 to 9 kHz) inherent in the knocking of the engine is derived through a band-pass filter from the output signal of the internal pressure sensor and is integrated in a time constant of 5 msec from 10° ATDC to 90° ATDC after half-wave rectification. As seen from the FIG. 3, the distribution results in a stratight line on a logarithmic propability paper under the condition of the absence of knocking, that is, shows a logarithmic normal distribution. On the other hand, under the condition of the presence of knocking, it results in a line rapidly folded at a given point. Similarly, FIG. 4 is a graphic illustration of distribution patterns of the maximum values Vmax sampled from the vibration of the engine under the same conditions. That is, the maximum values are obtained through a band-pass filter with a central frequency of 7.5 kHz and a band width Q of 20 dB from the output signal of a piezoelectric type knock sensor attached to the engine in association with the cylinder, which is identical to the pressure sensor-provided cylinder, between 10° and 90° ATDC. Both the knocking conditions in FIGS. 3 and 4 are equal to each other because the detections of the integrated values and the maximum values are concurrently performed with respect to the same cylinder.

When comparing the distribution pattern of FIG. 3 with that of FIG. 4 in the presence of knocking, it will be understood that there are differences between them. Namely, the folded angle of FIG. 3 distribution line is greater than that of FIG. 4 distribution line, and further the FIG. 3 distribution line is curvedly folded, while the FIG. 4 distribution line is linearly foled as obvious from the figures. This results from the fact that the internal pressure sensor has a higher performance in terms of distinguishing between noise and knock as compared with the piezoelectric type sensor. In other words, the S/N ratio in the internal pressure sensor is higher than that of the piezoelectric type sensor. However, the most important point with respect to the comparison between the distribution patterns of FIGS. 3 and 4 is that the folding cumulative points of both the distribution lines are substantially coincident with each other (in this case, both are folded at 70% point). This means that the cumulative value (%) corresponding to the folding point of the distribution line is very effective to determine a knocking condition, since the folding points of the distribution lines of the integrated values V and maximum values Vmax obtained from the sensors of different types are coincident in cumlative point with each other. The cumulative value corresponding to the folding point of a distribution line represents the ratio of non-knock cycle (noise cycle) to the entire cycle, that is, the remaining cumulative value (in this case, 100−70=30%) indicates the ratio of knock cycle to the whole cycle. This will hereinbelow be described in detail with reference to FIGS. 5A and 5B.

FIG. 5A shows frequency distribution patterns (upper illustration) and cumulative frequency distribution patterns (lower illustration) corresponding to two different knocking conditions with the S/N ratio being very high and the knock cycle and non-knock cycle being completely separable from each other, wherein the axis of of abscissas is marked in accordance with the logarithmic scale. Of the frequency distributions in the upper illustration, indicated by a solid line is a distribution pattern formed in a relatively small knocking condition, for example, wherein the ratio of noise and knock is 90:10, and iindicated by a dotted line is a distribution pattern formed in a relatively great knocking condition, for example, herein the knock cycle presents 40% in the entire cycle. In actual engine knock, a knock magnitude value becomes greater as the knock becomes greater; and therefore the portion of the dotted line-indicated distribution corresponding to the knock cycle is positioned at the right side (greater side of the knock magnitude). However, the generation frequency also increases in accordance with the increase in knocking, resulting in satisfaction of the technical basis of the present invention.

On the other hand, as obvious from the lower illustration of the cumulative distribution patterns formed to be plotted on a logarithmic normal propability paper under the same knocking conditions, each of the distribution lines is straight line up to a cumulative point and rapidly folded at the cumulative point and then curvedly extend to be concave configuration. The cumulative points corresponding to the folding points of the distribution lines respectively represent the ratio of noise, i.e., 90% in the solid line-indicated distribution and 50% in the dotted line-indicated distribution.

A frequency distribution pattern (upper illustration) and a cumulative frequency distribution pattern (lower illustration) obtained with the S/N ratio being very low to be hard to distinguish the knock from the noise or obtained from a knock magnitude value V resulting in a poor S/N ratio are indicated by dotted lines in FIG. 5B, wherein the knock generation frequency is 10%, that is, the ratio of noise and knock is 90:10. In FIG. 5B, for comparison, indicated by solid lines are a frequency distribution pattern and a cumulative frequency distribution patten obtained with a knock sensor with a high S/N ratio being employed under the same conditions.

As seen from the lower illustration of FIG. 5B, the distribution line obtained using a knock sensor with a high S/N ratio is folded at a point and curvedly extends, while the distribution line obtained using a knock sensor with a relatively low S/N ratio substantially linearly extends after folded. The cumulative points corresponding to both the folding points are substantially coincident with each other. Similarly, each of the cumulative points corresponds to the generation ratio of noise. This means that the cumulative point corresponding to the folding point of distribution line accurately represents a knock condition irrespective of the S/N ratio of the knock sensor and knock magnitude value. When the S/N ratio is low, it is impossible to accurately detect the knocking condition in accordance with conventional techniques wherein the knocking is determined with reference to a knock magnitude threshold, while the above-described technique determining the knocking condition on the basis of the cumulative point corresponding to the folding point on a logarithmic normal probability paper enables the accurate detection.

The fact that the distribution line formed on a logarithmic normal probability paper in the presence of knocking is rapidly folded is because high output data is against the estimation so as not to belong to the population of a distribution estimated from only data which is of a relatively low output and which can deem a substatial noise group. To detect a point of the distribution at which the data is against the estimation enables the accurate detection of a knocking condition. Therefore, it is not required in essence that the distribution results in approximation to the subtantial logarithmic distribution.

According to the above-mentioned distinguishing method of the knocking condition, it is impossible to detect the knocking condition when all sampled data represents knocking conditions, that is, the knocking occurs over the whole cycle. However, this problem will easily be resolved by further employing the conventional method or a means for monitoring the variance in view of the variance of data in such a knocking condition becoming extremely great.

The above-mentioned knocking detection method is easily realized as laboratory equipment such as knock monitoring equipment, since realized by a microcomputer are means for sampling data, means for performing the logarithmic transformation of the sampled data, and means for forming a cumulative frequency distribution and measuring the cumulative point corresponding to the folding point. However, there is a problem awaiting solution when this technical basis is adapted for an anti-knocking control system of a motor vehicle. Namely, in actual engines, it is required to detect the knocking condition as quick as possible, and it is also required to store a control algorithm in a random access memory (RAM) and Read-only memory (ROM) of a microcomputer to be mounted on a motor vehicle. Therefore, it would be desired to detect the cumulative point corresponding to the folding point of a distribution line with a simple method without sampling a number of data and performing the logarithmic transformation. One example of the method will be described with reference to FIGS. 6A and 6B.

FIG. 6A shows a cumulative distribution of log V (upper illustration), which is formed on a logarithmic normal probability paper, and a corresponding frequency distribution (lower illustration) in the condition that the knocking is less than a control target value, and FIG. 6B shows a cumulative distribution of log V (upper illustration) and a corresponding frequency distribution (lower illustration) in the condition that the knocking is greater than the control target value. When the knock condiction occuring in the ratio of 10% to the whole cycle is set as a control target knock condition (the remaining 90% is non-knocking cycle), the cumulative frequency distribution is folded at a point greater than the cumulative 90% point with the knocking being less than the target value as seen from the upper illustration of FIG. 6A. This means that the portion below 90% point has a straight line configuration, that is, assumes a logarithmic normal distribution.

Now, let it be assumed that two threshold values $V_L$ and $V_H$ are set symmetrically in distance with respect to the median M (cumulative 50% point on the logarithmic normal probability paper) on the logarithmic axis, so that log $V_H$−log M=log M−log $V_L$, i.e., $V_H/M = M/V_L$. Here, it is assumed that the lower side threshold value $V_L$ is set so that a knock magnitude value goes below the threshold value $V_L$ by a frequency equal to the control target knock occuring frequency 10%, that is, the threshold value $V_L$ is set to the cumulative 10% point. In this case, as shown in FIG. 6A, the upper side threshold value $V_H$ results in the cumulative 90% point in accordance with the nature of the logarithmic normal probability paper when the knocking is below the control target knocking condition. Therefore, when the knocking is smaller than the target value, the frequency that the knock magnitude value V goes below the threshold value $V_L$ is coincident with the frequency that the knock magnitude value V goes above the upper side threshold $V_H$ (in this case, 10%).

However, as shown in FIG. 6B, the distribution line is folded at a point lower than 90% point under the condition that the knocking is greater than the control target, and therefore the upper side threshold value $V_H$ does not correspond to the cumulative 90% point and corresponds to a point lower than the cumulative 90% point, resulting in increase in the frequency that the knock magnitude value V exceeds the threshold value $V_H$. In the upper illustration of FIG. 6B, the frequency increases by the amount indicated by an arrow a. Therefore, when the knocking is greater than the contol target, the frequency that the knock magnitude value V exceeds the upper side threshold value $V_H$ becomes greater than the frequency that it goes below the lower side threshold value $V_L$. Accordingly, it is possible to determine whether or not the knocking is greater than the control target, by monitoring the knock magnitude value V during a predetermined cycle and by comparing the number $N_L$ that the knock magnitude value V goes below the threshold value $V_L$ with the number that it exceeds the threshold value $V_H$.

A description will be hereinbelow made with respect to a method of setting the threshold values $V_H$ and $V_L$ First, the approximate value $V_M$ of the cumulative 50% point M is obtained without the data-sampling for the cumulative 50% point M. The cumulative 50% point is a point wherein the probability that the knock magnitude value V exceeds the 50% point M is equal to the probabiliy that it becomes below the 50% point M. Whenever the knock magnitude value V is inputted, the knock magnitude value V is compared with a given value $V_M$. When the knock magnitude value V is greater than the value $V_M$, the value $V_M$ is increased by ΔV. On the other hand, when it is smaller than the value M, the value $V_M$ is decreased by the same value ΔV. As a result of the repetition, the value $V_M$ is sequantially updated and converged to the cumulative 50% point. Namely, it is not required to obtain a distribution by sampling data in order to determine the cumulative 50% point.

Secondly, the lower side threshold value $V_L$ is obtained. The threshold value $V_L$ is the cumulative 10% point, and therefore the probability that the knock magnitude value becomes below the threshold value $V_L$ is 1/10 and the probability that it exceeds the threshold value $V_L$ is 9/10. This means that respective probabilities are 1:9. Therefore, the threshold value $V_L$ can be obtained in the same manner as in the cumulative 50% point M. Namely whenever the knock magnitude value V is inputted, the knock magnitude value V is compared with a given value $V_L$. When the knock magnitude value V is greater than the given value $V_L$, the value $V_L$ is increased by $\Delta V_L$. On the other hand, when it is smaller than the given value $V_L$, the given value $V_L$ is decreased by 9·$\Delta V_L$. As a result of the repetition, the given value $V_L$ is sequentially updated and converged to the cumulative 10% point. This results from the fact that the expected value for the increase and decrease of the value $V_L$ becomes zero only at the cumulative 10% point ($9/10 \times \Delta V_L - 1/10 \times 9 \cdot \Delta V_L = 0$). In principle, it is possible to converge a given value to an optional cumulative point by changing the ratio of the increasing amount and decreasing amount.

However, in the case of determining a cumulative point (for example, 10% point or 90% point) far from the cumulative 50% point, the ratio between the increasing amount and the decreasing amount becomes extremely great and there is the possibility of hunting in the vicinity of the converged value. The following is a description of another method of obtaining the threshold value $V_L$.

The knock magnitude value V is successively compared with a given value $V_L$ during the predetermined number C of cycles. When the knock magnitude value V becomes below the given value $V_L$ by at least one time during the predetermined cycles C, the value $V_L$ is decreased by $\Delta V_L$, and only when the knock magnitude value V successively exceeds the given value $V_L$ during the predetermined cycles C, the value $V_L$ is increased by $\Delta V_L$. The given value $V_L$ is updated at an interval of the predetermined cycles C. Since the the increasing amount is equal to the decreasing amount, the value $V_L$ is converged to a point relating to the following probability. Namely, assuming that the probability that the knock magnitude value V goes below the value $V_L$ is represented by P, the value $V_L$ is converged to a point satisfying the relationship of $(1-P)^C = 1-(1-P)^C$. When the value $V_L$ is converged to the cumulative 10% point, P is 0.1 and the cycle number is approximately 7. According to this method, it is possible to accurately obtain a cumulative point greatly far from the cumulative 50% point. The upper side threshold value $V_H$ can easily derived as a function of the cumulative 50% point $V_M$ and the lower side threshold point $V_L$ thus determined, that is, $V_H = V_M \cdot V_M/V_L$. It will be understood from the above description to easily obtain the cumulative point corresponding to the folding point without sampling data and without performing the logarithmic transformation.

Figure 7:
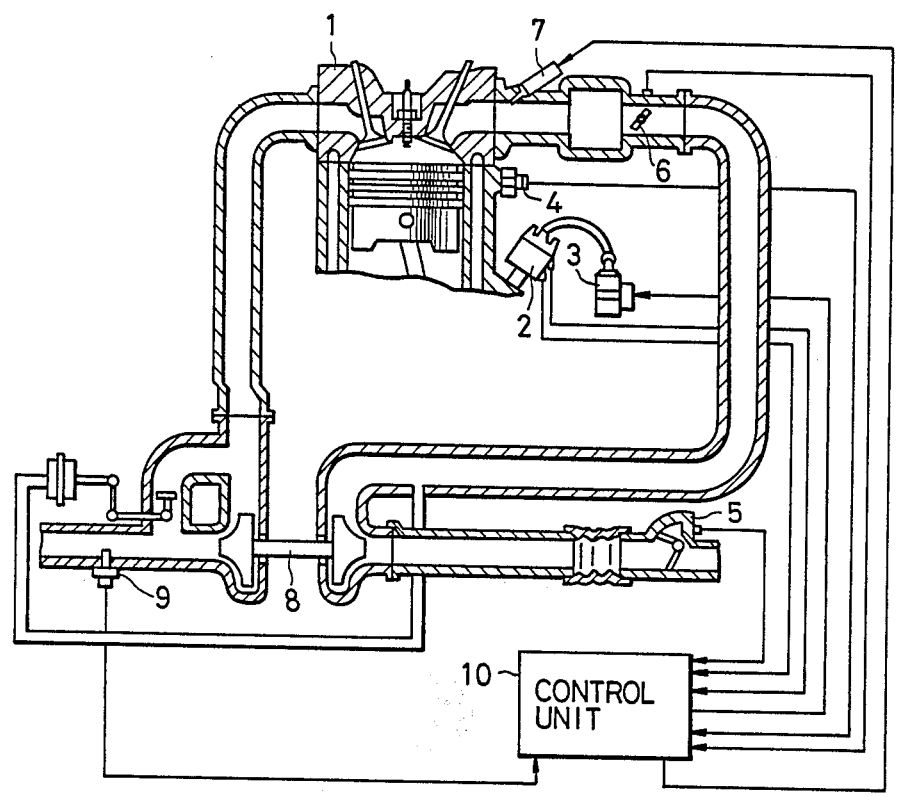
FIG. 7 is a schematic diagram of an anti-knocking control system according to the present invention incorporated in an internal combustion engine of a motor vehicle.

FIG. 7 is a schematic diagram of an anti-knocking control system according to the present invention incorporated in an internal combustion engine of a motor vehicle.

In FIG. 7, a four-cycle four-cylinder internal combustion engine 1 is partially illustrated and is provided with an intake airflow sensor 5 for measuring the flow rate of air taken in the engine throuth an intake passage and for generating a signal indicative of the measured air flow rate, a throttle valve 6 associated with a throttle angle sensor, and an injector 7 for injecting fuel through an intake manifold into the engine 1 in accordance with a fuel injection timing and a fuel injection period which are determined by a control unit 10 which will be hereinafter described in detail. Illustrated at numeral 2 is an ignition distributor including a reference angle sensor for detecting a reference crank angle position (for example, top dead center) and a crank angle sensor for generating an output signal at intervals of predetermined rotational angle of the engine 1. The ignition distributor 2 is associated with an ignitor 3 for performing the energization and deenergization of an ignition coil, not shown, in response to an ignition timing control signal from the control unit 10. Also provided in association with the engine 1 are a knock sensor of the piezoelectric or electromagnetic type for detecting the vibrations of the engine 1 resulting from knocking and an oxygen sensor 9 for generating a signal indicating that air-fuel ratio of a mixture is either on the rich side or lean side of stoichiometry. Numeral 8 represents a turbo charger.

Figure 8:
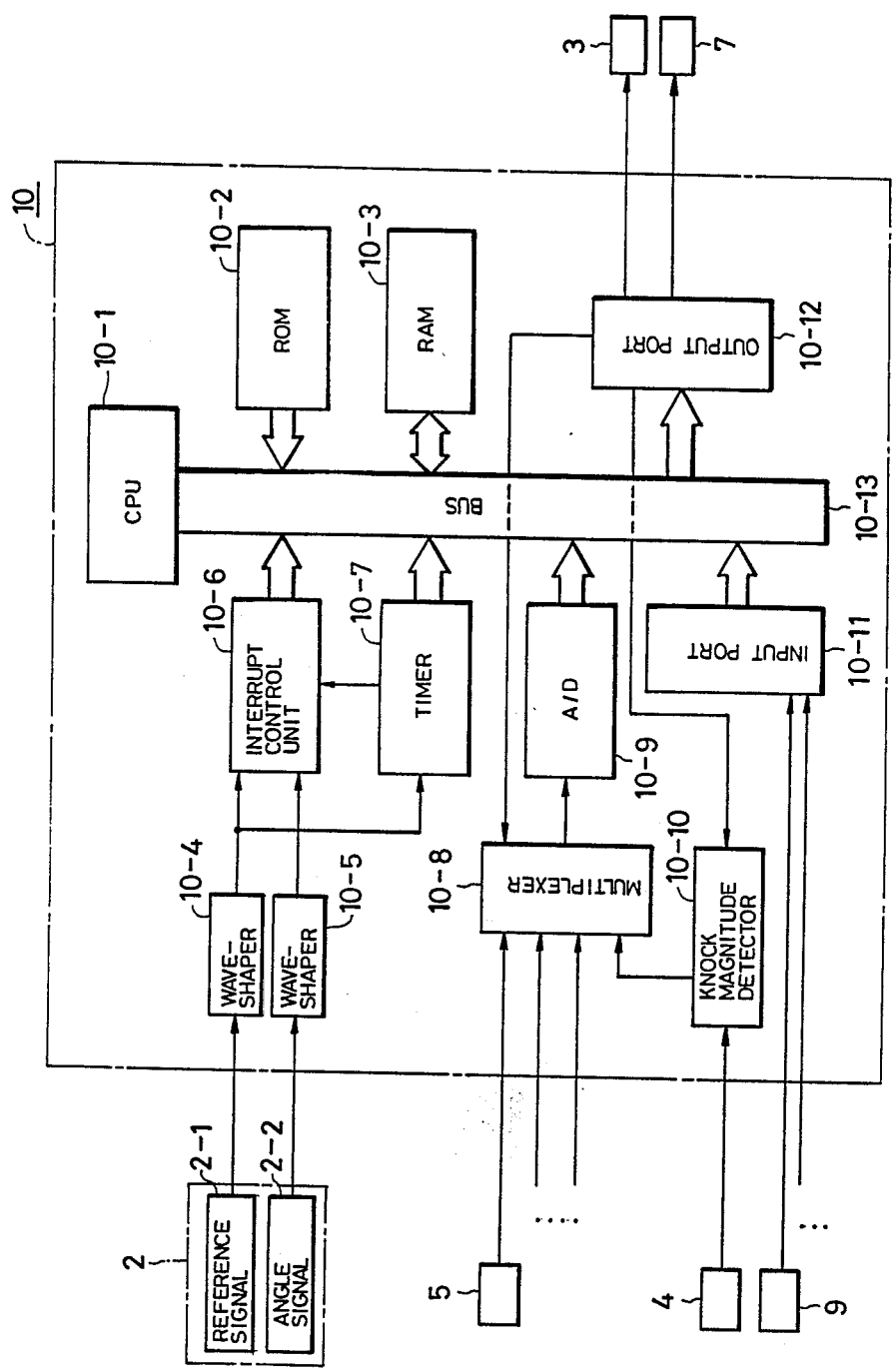
FIG. 8 is a schematic diagram showing the arrangement of a control unit employed in the anti-knocking control system.

The control unit 10 comprising a microcomputer will be described hereinbelow with reference to FIG. 8.

The microcomputer includes a central processing unit (CPU) 10-1 which comprises an 8-bit microprocessor, the CPU 10-1 determining ignition timing, fuel injection amount, and so on for anti-knock control in accordance with programmed instructions stored in a read-only memory (ROM) 10-2 and on the basis of various data from the above-mentioned sensors which are temporarily stored in a random access memory (RAM) 10-3. Signals to and from the CPU 10-1 are carried along a common bus 10-13 to which are coupled to the associated units including an interrupt control unit 10-6 coupled through waveform shaping circuits 10-4 and 10-5 to the reference angle sensor 2-1 and the crank angle sensor 2-2 of the ignition distributer 2, the output signals therefrom being wave-shaped by the waveform shaping circuits 10-5 and 10-5. The reference angle sensor 2-1 is also coupled through the waveform shaping circuit 10-4 to a 16-bit timer 10-7 for counts clock pulses generated, for example, intervals of 1 microsecond. The CPU 10-1 derives the engine speed and crank angle position from the interrupt control unit 10-6 and the timer 10-7. Namely, the CPU reads the count value from the timer 10-7 whenever the interruption occurs in response to the signal from the reference angle sensor 2-1, and computes the difference between the count value on the previous interruption and the count value on the present interruption, thereby obtaining the time interval of the generation of the signal from the reference angle sensor 2-1. The time interval corresponds to the time period necessary for one revolution of the engine 1, from which the engine speed can be calculated. On the other hand,, the crank angle position can be obtained on the basis of the signal from the crank angle sensor 2-2 generated at intervals of a predetermined crank angle, for example, 30° CA. Namely, the crank angle position information can be derived in units of the predetermined crank angle with respect to the top dead center indicated by the signal from the reference angle sensor 2-1. The crank angle signal is used as reference for generating the ignition timing control signal.

Also included in the microcomputer are an analog-to-digital converter (A/D converter) 10-9 for convertion to digitalized signals from analog signals supplied from the above-mentioned sensors, such as the airflow sensor, through a multiplexer 10-8 which is controlled in accordance with a signal from an output port 10-12. Further supplied through the multiplexer 10-8 to the A/D converter is a signal indicative of a knock magnitude value fed from a knock magnitude detection circuit 10-10 which is coupled to the knock sensor 4. The knock magnitude detection circuit 10-10 derives a knock magnitude value V from the output signal of the knock sensor 4 at every cycle. An input port 10-11 for digital signal receives the output signal of the oxygen sensor 9, the output signal of the throttle sensor 6, and so on. The output port 10-12 generates digitalized signals including an ignition timing control signal to the ignitor 3, a fuel injection control signal to the injector 7, a control signal to the multiplexer 10-8, and a control signal to the knock magnitude detection circuit 10-10.

Figure 9:
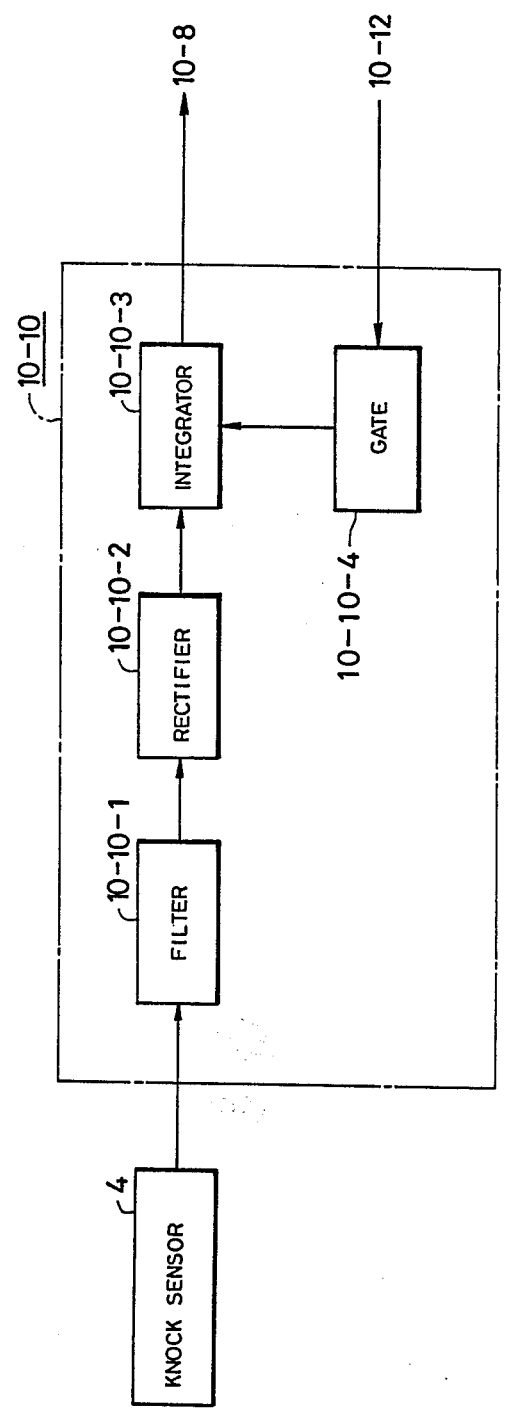
FIG. 9 illustrates one example of a knock magnitude detection circuit of the control unit of FIG. 8.

The knock magnitude detection circuit 10-10 is illustrated in detail in FIG. 9 as comprising a filter 10-10-1 for deriving only knock frequency components from the output signal of the knock sensor 4, a rectfier 10-10-2 for performing the full-wave rectification or half-wave rectification of the output signal of the rectifier 10-10-1, an integrator 10-10-3 for obtaining a knock magnitude value at every cycle by integrating the output signal of the rectifier 10-10-2, and a gate circuit 10-10-4 for controlling the integral interval of the integrator 10-10-3.

Figure 10:
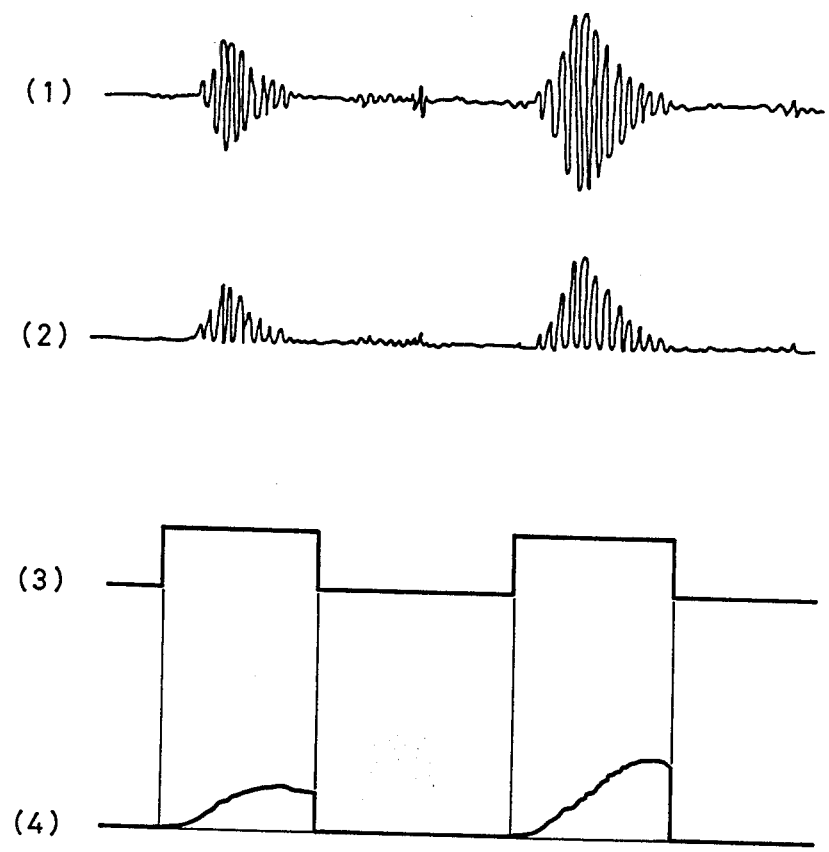
FIG. 10 is a graphic illustration useful for describing the operation of the knock magnitude detection circuit.

FIG. 10 is a graphic illustration useful for describing the operation of the knock magnitude detection circuit 10-10.

In FIG. 10, numeral (1) represents the output signal of the knock sensor 4 after passing through the filter 10-10-1, numeral (2) designates a signal obtained by performing the half-wave rectification of the output signal of the knock sensor 4 after passing therethrough, numeral (3) depicts the output signal of the gate circuit 10-10-4 which is actuated in accordance with the control signal from of the output port 10-12 of the control unit 10, and numeral (4) represents the output signal of the integrator 10-10-3 which is set or reset by a signal from the gate circuit 10-10-4. The output signal of the gate circuit 10-10-4 is a pulse signal which is risen at approximately 10° ATDC and fallen at approximately 90° ATDC immediately after a knock magnitude value is received by the CPU 10-1.

The integrator 10-10-3 has, for example, a time constant of approximately 5 msec, and starts to integrate the half-wave rectified signal (2) in response to the rising edge of the output signal of the gate circuit 10-10-4 and resets the integrated value in response to the falling edge thereof. The output signal of gate circuit 10-10-4 is fallen immediately after the CPU 10-1 has received the integrated value through the multiplexer 10-8 and A/D converter 10-9 and the integrated value, i.e., knock magnitude value, obtained at every cycle is sequentially fed to the CPU 10-1.

Figure 11:
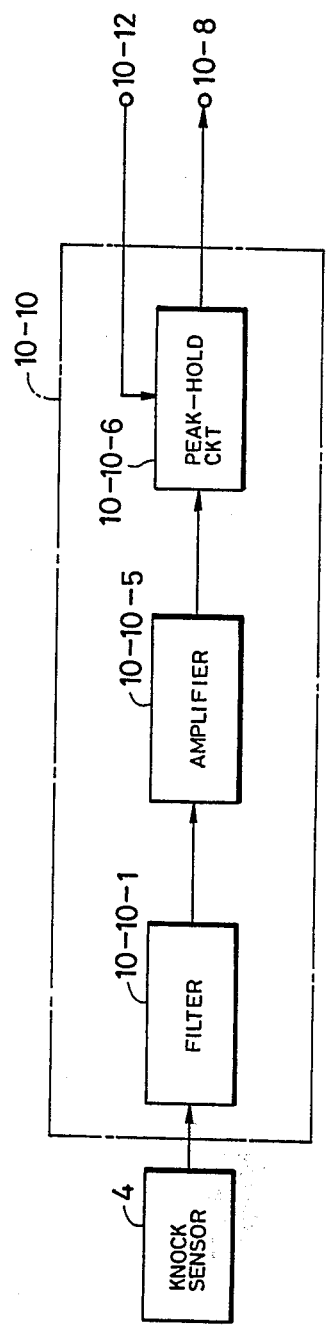
FIG. 11 shows another example of the knock magnitude detection circuit.

On the other hand, when the maximum value Vmax is employed as the knock magnitude value V, the knock magnitude detection circuit 10-10 is shown in FIG. 11 as including the filter 10-10-1 for deriving only knock frequency components from the output signal of the knock sensor 4, an amplifier 10-10-5 for amplifying the output signal of the filter 10-10-1, and a peak-hold circuit 10-10-6 constricted, for example, by a capacitor for peak-holding the output signal of the amplifier 10-10-5 in response to a signal from the output port 10-12.

The detection of knocking and anti-knocking control system according to the present invention will be described with reference to FIGS. 12 to 16.

Figure 12:
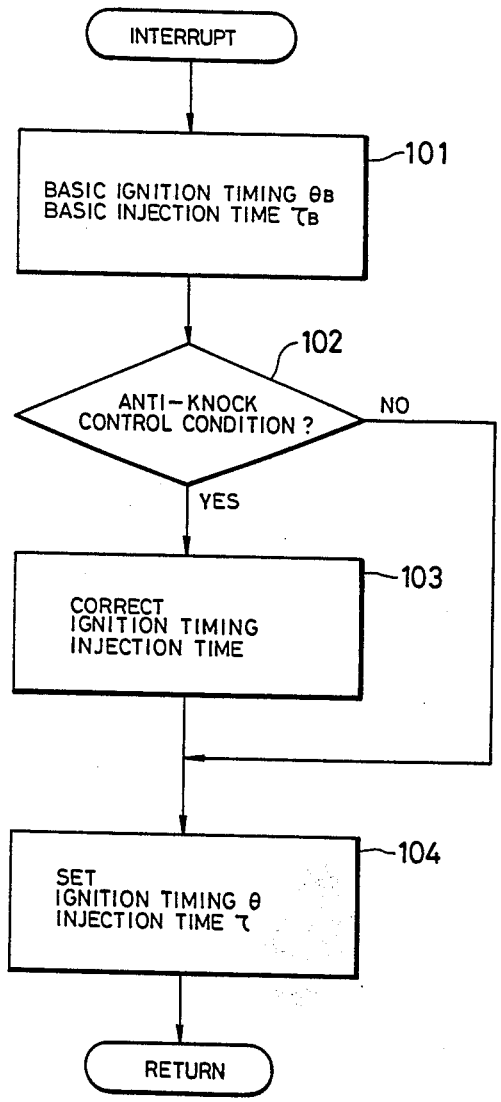
FIG. 12 is a flow chart showing an interrupt routine for setting an ignition timing and a fuel injection time period to a time of the control unit of FIG. 8.

FIG. 12 is a flow chart showing an interrupt routine for setting an ignition timing and a fuel injection time interval to the timer 10-7 of the microcomputer.

The program execution starts at a step 101 in response to an interrupt command. In the step 101, the CPU computes a basic ignition timing $\theta_B$ and a basic fuel injection time period $\tau_B$. The basice ignition timing $\theta_B$ and a basic fuel injection time period $\tau B$ can be obtained as a function of the engine speed N and engine load Q/N from a two-dimentional map stored in the ROM 10-2, where Q represents the intake air amount sensed by the airflow sensor 5. The engine load is proportional to a value obtained by dividing the intake air amount Q by the engine speed N. Furthermore, in the step 101, an ignition timing and a fuel injection duration are respectively corrected on the basis of various signals from the sensors other than the knock sensor 4 such as coolant temperature signal and battery voltage indicating signal.

The control advances to a step 102 to check whether the engine is in the condition to be knock-controlled. The anti-knocking control performed, for example, when the engine load is light results in lowering in engine output and in deterioration in fuel consumption, and therefore it is required to check the engine operating condition. In this case, the anti-knocking control will be performed when the engine load Q/N is greater than a predetermined value. It will be appropriate that the anti-knocking control is effected in accordance with the engine speed N. If the engine is in the knock-controlled condition, a subsequent step 103 is executed to correct the ignition timing and fuel injection time period. The correction amount of the ignition timing is determined as $\theta = \theta_B - R$ in the other routine which will be described hereinafter, where R is a retardation amount from the basic ignition timing $\theta_B$.

On the other hand, the correction amount of fuel injection time is determined on the basis of the retardation amount R. Namely, the exhaust temperature may become exctremely high because the ignition timing is retarded when the retardation amount R is great, and therefore in this case it is required to increase the fuel injection time so as to place the air-fuel ratio to the rich side. For example, the correction amount of the fuel injection time is determined so as to be proportional to the retardation amount R. The final ignition timing $\theta$ and final fuel injection time period $\tau$ are respectively set in a timer of the microcompter in the next step 104. If not in the step 102, the control jumps to this step 104.

Figure 13:
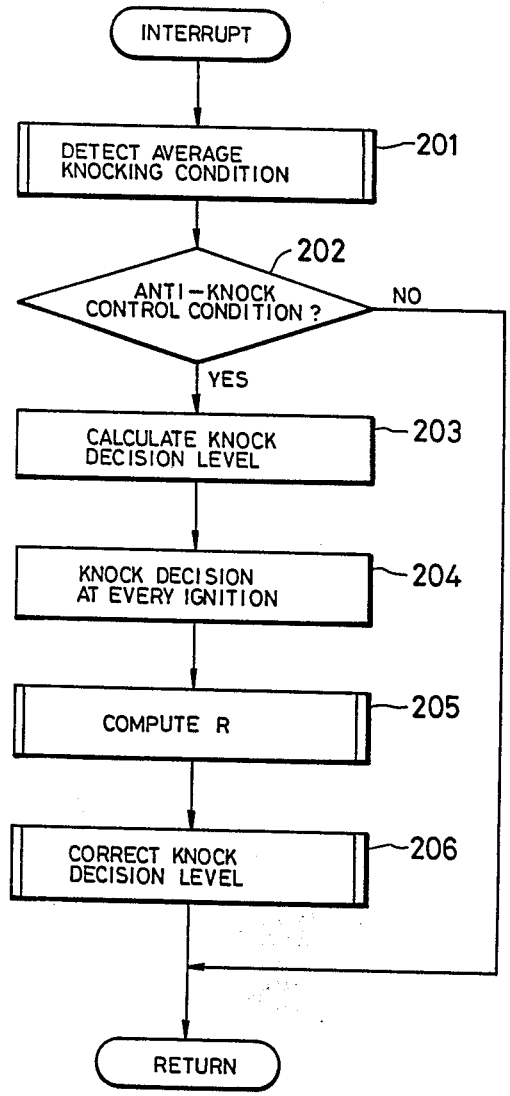
FIG. 13 is a flow chart showing an interrupt routine for detecting the knocking condition and performing an anti-knocking control.

FIG. 13 is a flow chart showing an interrupt routine for detecting the knocking condition and performing an anti-knocking control. In this embodiment, this interrupt routine will be executed in the vicinity of the top dead center (TDC) of the engine at every ignition cycle.

This routine begines with a step 201 in which an average knocking condition in relatively many cycles is detected and which will be hereinafter described in detail. A subsequent step 202 is executed to determine whether the engine is in the condition to be antiknock-controlled. If not, the operational flow returns to repeat this interrupt routine. If so, the step 202 is followed by a step 203 in order to compute a knock decision level Vref for checking the presence or absence of knocking. Here, the conventional knock detection method wherein the knocking condition is detected at every cycle and the ignition timing is retarded at every cycle is employed considering the fact that many knocks occurs during an extremely short time period, for example, when the engine is rapidly accelerated. The knocking detection method according to the present invention requires a relatively long time period for sampling data over a plurality of cycles.

The knock decision level Vref is obtained as $Vref = K \cdot V_M$ wherein $V_M$ is a value coverged to the median value of a frequency distribution and obtained in each engine cyclinder in the step 201 and K is a constant which is set in each cylinder. The setting of the knock decision level Vref in each cylinder causes an accurate knock detection. While the constant K is corrected in the following step, its initial value is obtained from a two-dimentional map stored as a function of the engine speed and cylinder in the ROM 10-2.

In a step 204, the CPU compares the knock decision level Vref with a knock magnitude value V in the ignition cycle immediately before, that is, performes the knock detection at every ignition. In accordance with the results of the comparison, the retardation amount R of ignition timing is calculated in a step 205 which will be hereinafter described in detail. Subsequentially, a step 206 is executed to check whether the present knock decision level Vref is proper or not, and if not, the knock decision level Vref is corrected to be proper, which will be hereinafter described in detail. After the termination of the step 206 execution, the operational folow returns to the start of this routine.

The detection of the knocking condition in the step 201 of FIG. 13 will be described in detail with reference to FIG. 14.

In a step 2011, a knock magnitude value V introduced at the present time is compared with the above-mentioned upper side threshold value $V_H$ with respect to the cylinder. If $V > V_H$, the count value $N_H$ of a counter is incremented by one in a subsequent step 2012. Otherwise, the control goes to a step 2013 in which the knock magnitude value V is compared with the above-mentioned lower side threshold value $V_L$. If $V < V_L$ in the step 2013, the count value $N_L$ of a counter is incremented by one in a step 2014 and the control goes to a step 2015. If not in the step 2013, the control directly goes to the step 2015.

In the step 2015, the value corresponding to the cumulative 50% point is updated in the above-mentioned method. Namely, when the knock magnitude value V exceeds the present value $V_M$ with respect to the cylinder, i.e., $V > V_M$, the value $V_M$ is increased by $\Delta V_M$. On the other hand, when $V > V_M$, the value $V_M$ is decreased by $\Delta V_M$. Thus, the value $V_M$ is updated to always correspond to the cumulative 50% point.

Following the step 2015, a step 2016 is executed to check whether now is the time of the detection of knocking condition. Namely, the detection of the knocking condition is made at a predetermined interval, for example, approximately 0.7 sec. The reasons that the interval is determined in accordance with cycle but is determined by time period are as follows.

The first reason is to detect the knocking condition in line with the person's functional evaluation. Generally, when the human checks the knocking condition, the knocking condition is determined in accordance with the number of knocks occuring during a time period. The engine cycle does not directly affect the human's evaluation in terms of the knocking condition, and on the other hand the time period offer influence to the knocking condition detection. Therefore, the detection of the knocking condition in units of time results in elimination of the dviver's uncomfortable feeling.

The second reason is connected to the updatings of the lower side threshold value $V_L$ and the value $V_M$. As described above, to check whether the knocking condition is greater than the target, it is required to set the lower side threshold value $V_L$ to the cumulative point equal to the knock generating frequency in a target knocking condition. However, the target knocking condition is generally set to become smaller as the engine speed becomes higher. In the low speed range, a relatively many occurrence of knock does not cause the damage of the engine and results in improvement in engine output and fuel consumption. On the other hand, in the high speed range, even if the frequency of knock is relatively low, the knock leads to preignition and may result in the damage of the engine. Accordingly, in the high speed range, it is required that the knocking is limited to be in a relatively light condition. This means that it is desired that the lower side threshold value $V_L$ is set to a smaller cumulative point in accordance with increase in engine speed. To set the threshold value $V_L$ to a smaller cumulative point, as described above, is achieved by increase the number C of cycles for the updating of $V_L$. When the threshold value $V_L$ is updated at a predetermined interval, the number C of cycles is increased in accordance with increase in engine speed, thereby achieving the above-mentioned purpose.

Subsequentially, a step 2017 is executed to determine whether the engine operating condition is rapidly changed during the detection interval. Namely, it is checked whether the engine speed and engine load are varried to become more than predetermined values during a time period of 0.7 sec. For example, in this embodiment, the allowable range of the engine speed is set to ±300 rpm and the allowable range of the engine load is set to ±50 mmHg in pressure conversion. If the engine speed and engine load respectively assume values in the ranges, a subsequent step 2018 is executed to detect the knocking condition. The detection of the knocking condition is effected by comparison between the number of times $N_H$ that the knock magnitude value V exceeds the upper side threshold value $V_H$ and the number of times $N_L$ that the magnitude value V goes below the lower side threshold value $V_L$ at every cylinder. When the number $N_H$ is substantially equal to the number $N_L$, it is determined that the knocking condition of the cylinder is lower than the target knocking condition. When the number $N_H$ is greater than the number $N_L$ irrespective of the consideration of error component, it is determined that the knocking is greater than the target value. The detected knock condition is stored using a flag at every cylinder and at the same time a flag indicating the termination of detection of the knocking condition is set.

The upper side threshold value $V_H$ and the lower side threshold value $V_L$ are respectively updated as follows in the next step 2019. Namely, the threshold values $V_H$ and $V_L$, as described above, are in the relation of $V_H/V_M = V_M/V_L$. Therefore, assuming that the geometrical value is A, i.e., $V_H/V_M = V_M/V_L = A$, the threshold values $V_H$ and $V_L$ can be updated by updating the geometrical value A. Since $V_L = V_M/A$, the threshold value $V_L$ is decreased by $\Delta V_L$ by increasing the geometrical value A by $\Delta A$ when the knock magnitude value V goes below the threshold value $V_L$ at least one time, that is, when the number $N_L$ counted in the step 2014 is equal to or more than one. When $N_L = 0$, the threshold value $V_L$ is increased by $\Delta V_L$ by decreasing the geometrical value A by $\Delta A$. Thus, it is possible to set the threshold value $V_L$ to a desired cumulative point. On the other hand, since $V_H = A \cdot V_M$, it is possible to updating the threshold value $V_H$ at every cylinder in the similar manner as in the threshold value $V_L$.

In a subsequent step 2020, the counted numbers $N_H$ and $N_L$ are respectively cleared so that $N_H = 0$ and $N_L = 0$, and the step 2020 is followed by a step 2021 in which the counter for detection interval (0.7 sec) is also cleared.

Figure 15:
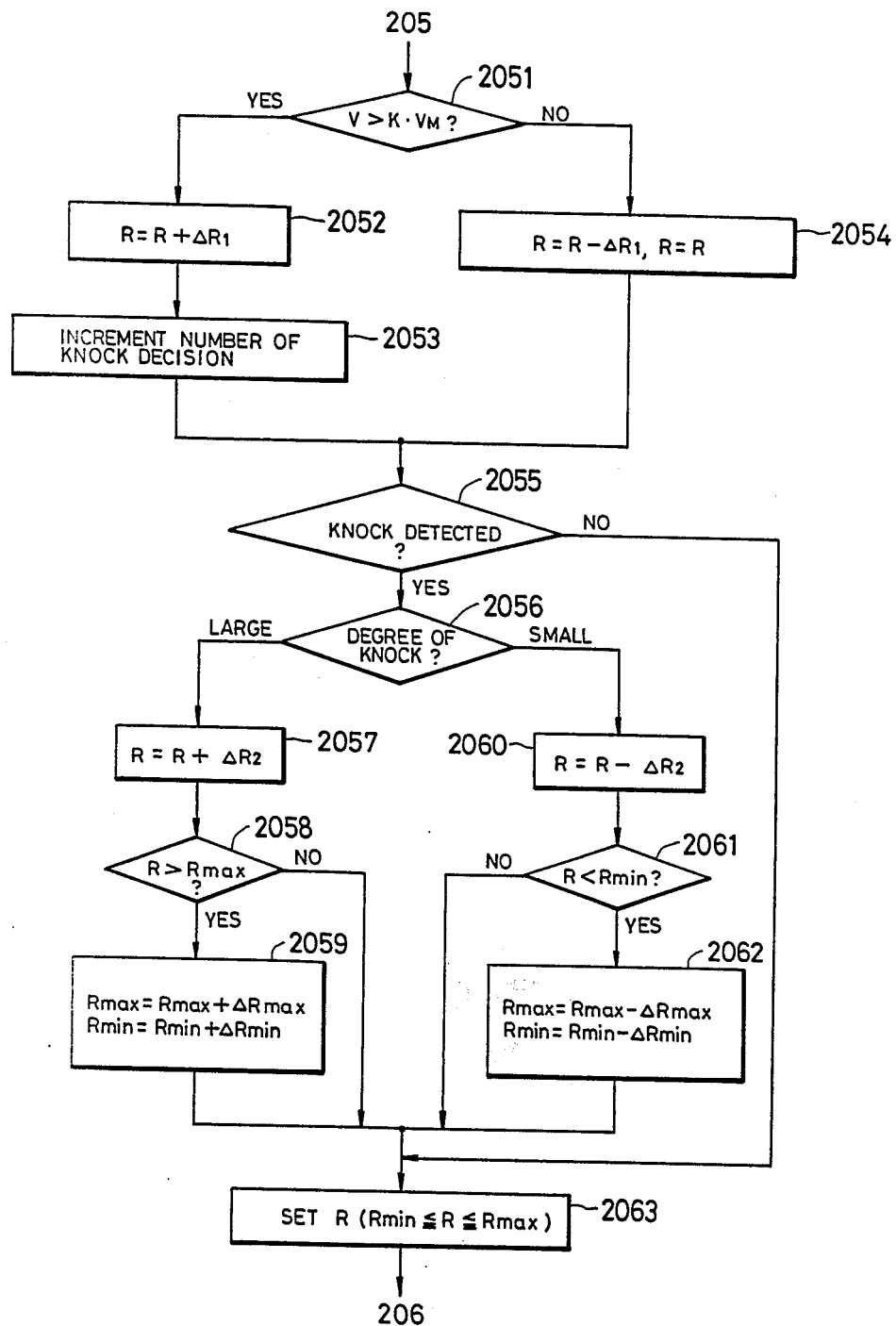
FIG. 15 is a flow chart for describing the calculation of the retardation amount R of the ignition timing performed in the step 205 of FIG. 13.

FIG. 15 is a flow chart for describing the calculation of the retardation amount R of the ignition timing performed in the step 205 of FIG. 13.

In a decision step 2051, the knock magnitude value V is compared with the knock decision level $K \cdot V_M$. If $V > K \cdot V_M$, indicating that this cycle is in the knocking condition, a step 2052 is executed to increase the retardation amount R with respect to the basic ignition timing by $\Delta R1$. $\Delta R1$ is also used in general anti-knocking control, and is generally set to 0.5° to 2° CA (crank angle). It is assumed in this embodiment that $\Delta R1 = 1°$ CA. In a step 2053, the count value is incremented, the count value indicating the number of times determined as knocking cycle and being used for correction of the knock decision level. On the other hand, if $V < K \cdot V_M$ in the step 2051, indicating that the cycle is in the non-knocking condition, the step 2051 is followed by a step 2054 wherein the retardation amount R is decreased by $\Delta R1$ for correction of the ignition timing in the advancing direction under only the condition that the non-knocking continues for a predetermined time period (for example, 1 sec). Otherwise, the retardation amount R is maintained as it is.

Figure 14:
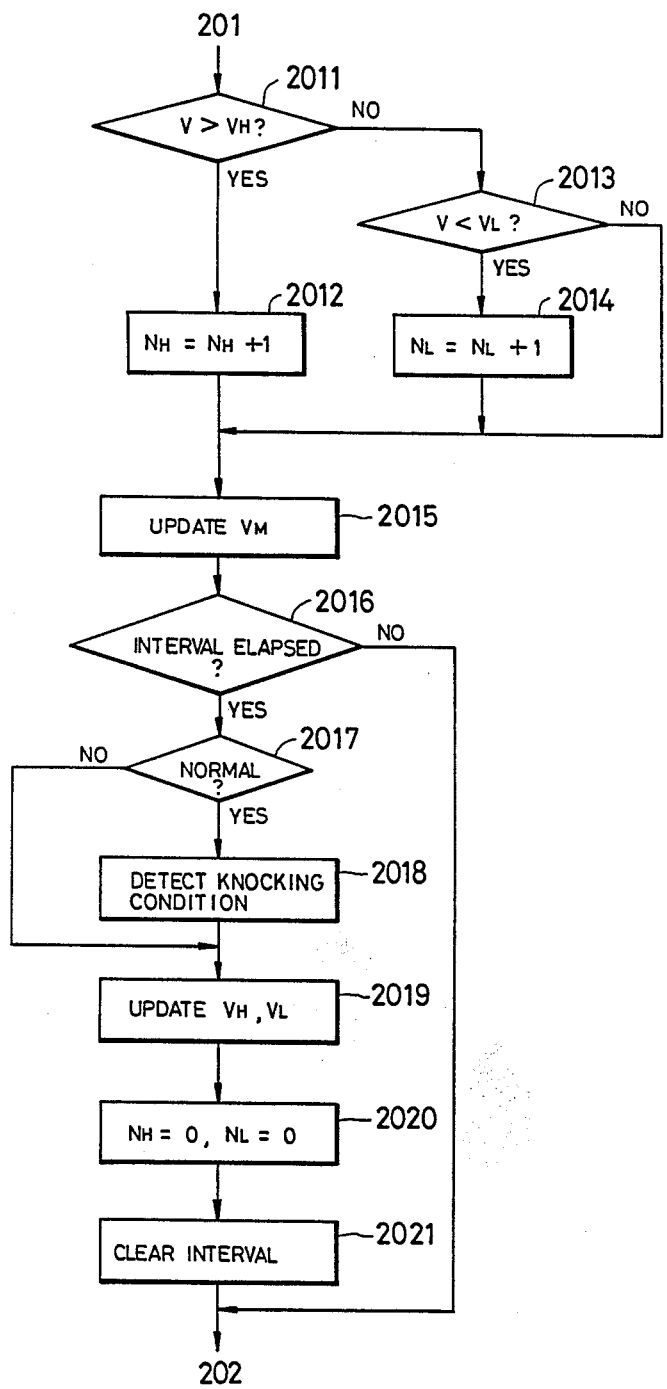
FIG. 14 is a flow chart illustrating the detail operation of the step 201 of the flow chart of FIG. 13.

A step 2055 is provided for check whether the average knocking condition is detected in accordance with the knocking condition detection termination flag in the step 2018 of FIG. 14. If not for the detection interval, this step is followed by a step 2063. If so, that is, the flag is set, a step 2056 is executed to check the degree of the knocking condition in accordance with the flag indicating that the knocking occurs in the condition exceeding the target knocking condition. If the flag is set, that is, if the knocking exceeds the target knocking degree, a step 2057 is executed to increase the retardation amount R by $\Delta R2$. $\Delta R2$ differs from $\Delta R1$ for detardation and is the amount for correcting the ignition timing in accordance with the average knocking condition, and therefore it will be set to a value (for example, 0.5° CA) smaller than $\Delta R1$. As a result, the retardation amount R is slowly corrected in accordance with the average knocking condition and slightly gradually corrected so as to quickly prevent knock in accordance with the presence or absence of occurrence of knocking in each cylinder.

In the case that the retardation amount R is set in each cylinder, that is, the ignition timing is controlled in each cylinder, the retardation amount R is increased or decreased in accordance with the knocking condition of the corresponding cyclinder. On the other hand, in the case that the ignition timing control is concurrently performed for all cylinders, that is, the retardation amount R is one value, the retardation amount R will be increased or decreased under the total determination of the knocking condition for all cylinders. For example, in the case of a four-cylinder engine, when the detection of the knocking condition with greater degree is made with respect to more than one cylinders, it will be determined that the entire knocking is greater in degree than the target knocking condition. Furthermore, it is possible to directly detect the whole knocking condition by commonly setting $N_L$ and $N_H$ for all cylinders. In this case, it will be desired to set the threshold values $V_H$, and $V_H$ in each cylinder. However, it is also possible to commonly set the threshold values $V_L$ and $V_H$ for all cylinders at more or less the sacrifice of detection accuracy of the knocking condition.

Subsequentially, in a step 2058, the retardation amount R is compared with the maximum retardation amount limit Rmax. Generally, the retardation amount R is limited in order to prevent the excesive variations of ignition timing in anti-knock control and prevent the exhaust temperature from rising, and conventionally the amount R has been a fixed value determined in advance. However, in this embodiment, it is updated in accordance with the average knocking condition. Namely, the retardation amount R is set to be between the minimum retardation amount limit Rmin and the maximum retardation amount limit Rmax in order to prevent the ignition timing from being unnecessarily advanced or retarded, and it is controlled so as to cover the variation of season, difference in characteristic of gas, discrepancy in engine characteristic. When the ignition timing is excessively retarded, that is, when the retardation amount R become excessively great, the exhaust temperature is risen. However, when the knock occurs in a greater proportion, it is required to further retard the ignition timing because the engine is damaged. In this case, it will be appropriate to use a ramp lighted in response to the detection of this abnormal condition. The step 2058 is provided for determining whether the control range of the retardation amount R is to be corrected in the retarding direction. That is, when the retardation amount R is required to be set to a value greater than the maximum retardation amount Rmax and the level of the average knock is greater, the maximum retardation amount Rmax is increased by ΔRmax (for example, approximately 0.2° CA) and at the same time the minimum retardation amount Rmin is also increased by ΔRmin ( for example, about 0.2° CA) in a step 2059, whereby the range limited in terms of the retardation amount R is corrected in the retarding direction. It is desired that the range is set to, for example, approximately 5° to 7° (Rmax−Rmin is approximately 5° to 7° CA).

On the other hand, in the step 2056, if the knocking condition is greater in degree that the target knocking condition, the step 2056 is followed by a step 2060 in which the retardation amount R is decreased by ΔR2 (in the advancing direction), followed by a step 2061 in which the retardation amount R is compared with the minimum retardation limit Rmin. If it is greater than Rmin, a step 2062 is executed so that the control range of the retardation amount R is corrected in the advancing direction, that is, Rmax=Rmax−ΔRmax and Rmin=Rmin−ΔRmin. Thereafter, a step 2063 is executed to finally limit the retardation amount R. If R>Rmax, R is set to Rmax. If R<Rmin, R is set to Rmin.

Figure 16:
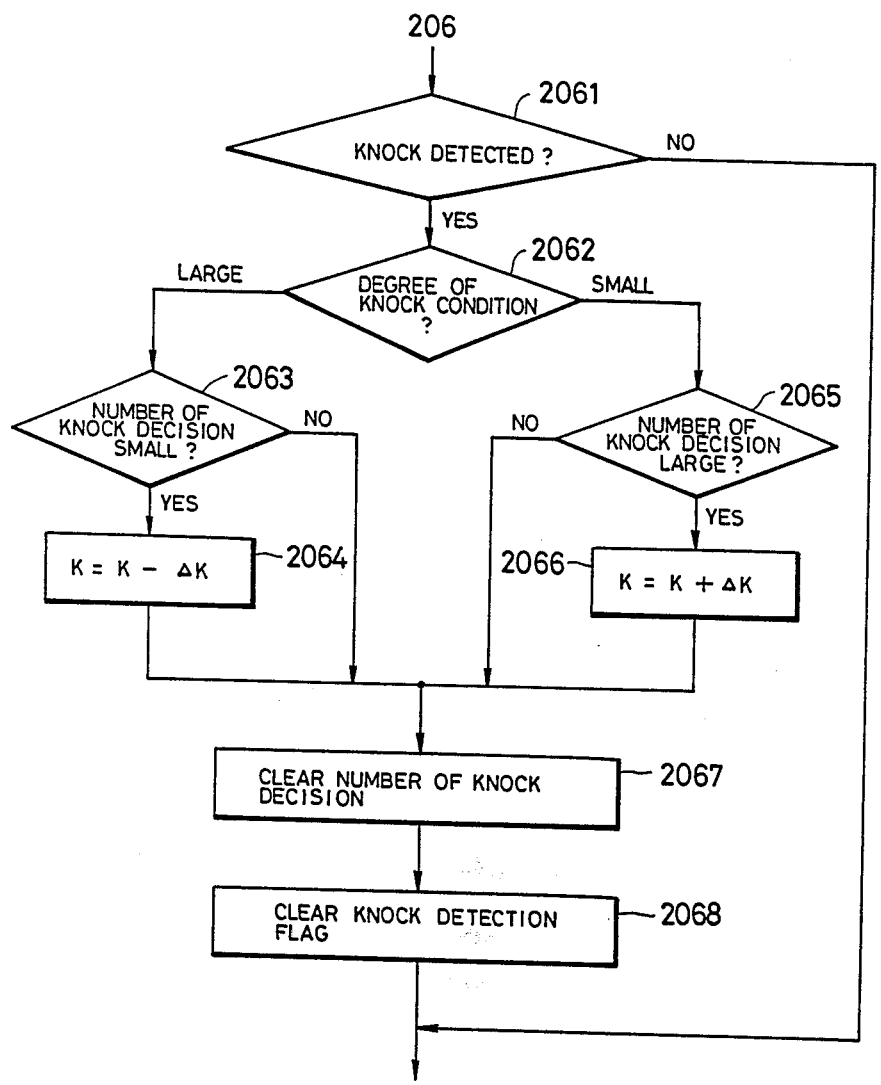
FIG. 16 is a flow chart for describing the detail processes of the step 206 of the routine of FIG. 13.

Next, the description in terms of correction of the knock decision level executed in the step 206 of FIG. 13 will be made with reference to a flow chart of FIG. 16.

First, a step 2061 is executed to check whether the knock condition is detected. This is determined in accordance with the knock detection termination flag. If detected, a step 2062 follows to check the level of the knocking condition. If the level is greater than the target knocking condition level, a step 2063 is executed to check the number of times of knock decision performed at every cycle which the number is the value counted in the step 2053 of FIG. 15. If the knock decision count value is smaller than a predetermined value, the determination is made wherein the knock decision level is exceedingly high, and therefore K is decreased by ΔK in order to lower the knock decision level (step 2064). Namely, the fact that the level of the knocking condition is high and in addition the knock decision frequency is small results from the exceedingly high knock decision level. In the step 2063, when the knock decision frequency is relatively great, K is maintained under the determination that the knock decision is normally performed.

On the other hand, in the step 2062, if the level of the knocking condition is lower than the target knocking condition level, a step 2065 is executed to check whether the knock decision frequency is exceedingly great. If so, the step 2065 is followed by a step 2066 in which K is increased by ΔK so that the knock decision level becomes higher. Namely the fact that the knocking condition level is low and concurrently the knock decision frequency is great results from that the noise cycle is determined as knock cycle. When the knock decision frequency is small, that is, the knock does not occur, K is maintained as it is. The correction of the knock decision level is performed at very cylinder. K in each cylinder is corrected on the basis of the knocking condition and knock decision frequency in the corresponding cylinder. There is no doubt that K is commonly set for all cylinders. It is also appropriate that the decisions in the steps 2063 and 2065 are merely made on the basis of the presence or absence of the knock decision. The knock decision frequency is cleared in a step 2067 and the knock detection termination flag is reset in a subsequent step 2068.

In the above description, the average level of the knocking conditions is detected, whereby the ignition timing, control range of the ignition timing, and knock decision level are respectively corrected. However, for example, the detection of the knocking condition can be independently employed for a knock monitoring device or a gas octane number detecting device. In the case of application to an actual motor vehicle, it can be used as indication of the abnormal occurrence of knocking caused by the characteristic of gas or the like.

Figure 17:
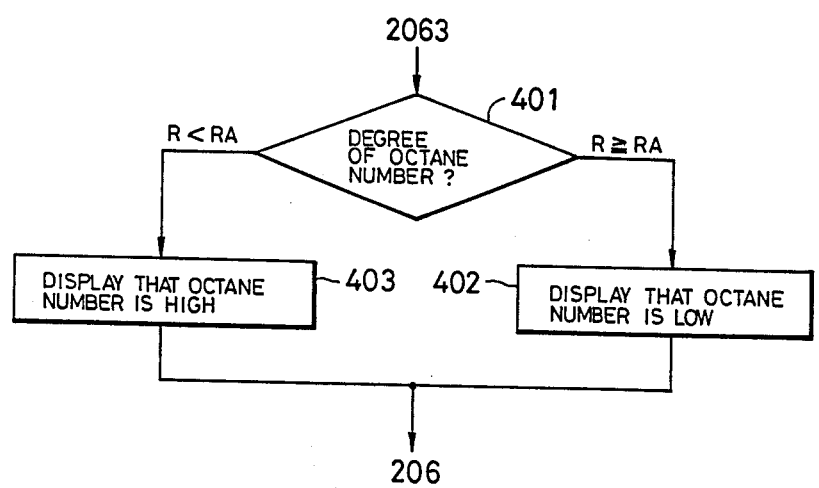
FIG. 17 shows the additional steps for determining and displaying the degree of gas octane number.

FIG. 17 shows one example for determining and displaying the degree of the gas octane number. In a step 401, the retardation amount R obtained in the step 2063 of FIG. 15 is compared with a predetermined value RA. In accordance with the results of comparison in the step 301, the degree of the gas octane number is indicated in steps 402 or 403. The retardation amount R represents the degree of the possibility of knocking generation, and the degree of the octane number is determined in accordance with the retardation amount R.

Figure 18:
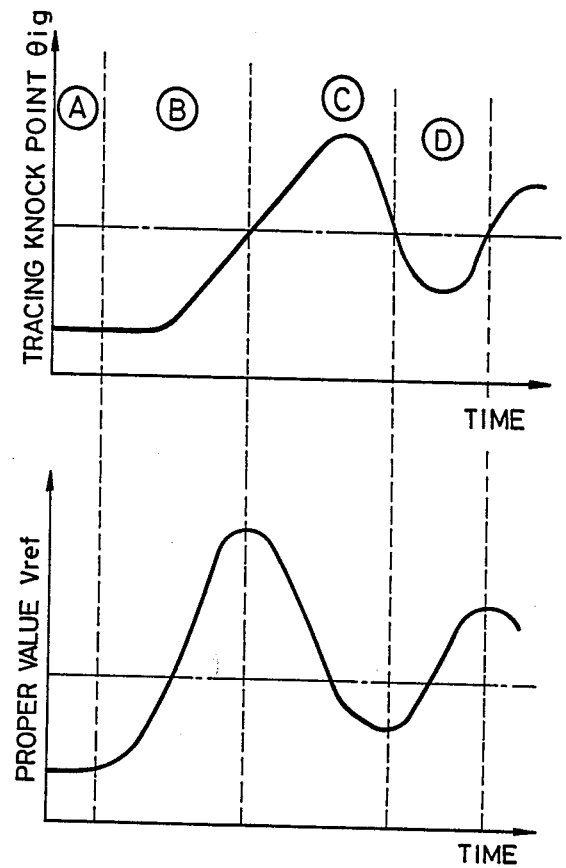
FIG. 18 is a graphic illustration useful for describing the hunting of ignition timing which occurs upon the correction of the knock decision level.

FIG. 18 is a graphic illustration useful for describing the hunting of, for example, ignition timing which would occur upon the correction of the knock decision level.

In FIG. 18, the reference character (A) represents the time period most retarded due to the exceedingly low of the knock decision level Vref. In this case, the knock decision level Vref is increased under the determination that Vref is extremely low due to non-knocking. The character (B) designates the time period during which the knock decision level Vref is acutally increased. In this time period (B), the ignition timing $\theta$ig is started to be advanced. However, the knock decision level Vref is corrected to exceed a proper value because the knocking level is extremely low and the ignition timing $\theta$ig is advanced to exceed a tracing knock point (time period C), resulting in the occurrence of knocking. Due to the occurrence of knocking, the knock decision level Vref is corrected to go below the proper value, and therefore the ignition timing $\theta$ig is retarded to go below the tracing knock point (time period D). This repetation causes the hunting of the ignition timing.

Furthermore, when a high octane gas is used for a motor vehicle, the knocking is not apt to occur as compared with the case of use of a low octane gas. Therefore, for example, the ignition timing is corrected in the advancing direction and the knock decsion level Vref is gradually increased in the direction that the detection of knock sensor signal becomes difficult. Thereafter, when the low octan gas is used, the knocking generation is made easy, and therefore the ignition timing is corrected in the retarding direction and the knock decision level is gradually decreased. However, in this case, there is the possibility of exceedingly occur until the knock decision level is decreased up to a proper value corresponding to the low octane gas.

Figure 19:
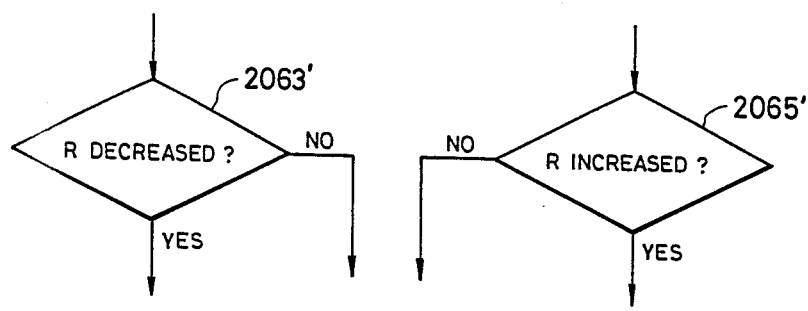
FIG. 19 shows the steps which are executed in place of the steps 2063 and 2065 of FIG. 16.

The elimination of these problems can be performed in accordance with the above-mentioned method, i.e., the frequency of knock decision, but is also achieved by checking the varrying direction of the ignition timing. Namely, the steps 2063 and 2065 of FIG. 16 are respectively replaced with steps 2063' and 2065' shown in FIG. 19. In the step 2063', it is determined whether the present retardation amount R is descreased as compared with the amount R prior to a predetermined time period T. On the other hand, in the step 2065', it is checked whether the present retardation amount R is increased as compared with R prior to T.

As described above, it is possible to detect the knock occuring condition on the basis of the pattern configuration of a distribution of the logarithmic transformation values of knock magnitude values obtained from the output signal of a knock sensor, wherein the knock decision level for determining the occurrence of knocking is corrected on the basis of the degree of knocking condition and the knock decision frequency. However, while the knock decision level has been corrected, the anti-knocking control is performed in accordance with an inappropriate knock decision level, resulting in many occurrence of knocking due to the excessive advance of ignition timing and torque loss due to the excessive retardation thereof. Therefore, it would be required to quickly correct the knock decision level.

Figure 20:
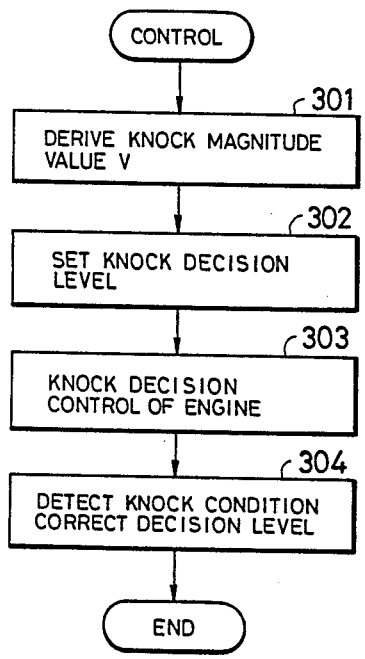
FIG. 20 is a flow chart for describing a method of eliminating the problem in which the anti-knock control is performed in accordance with an inappropriate knock decision level while the knock decision level is corrected.

FIG. 20 is a flow chart for describing the method of eliminating the above-mentioned problem.

This anti-knock control routine begins with a step 301 in which the knock magnitude value V is obtained from the output signal of the knock sensor 4 at a predetermined interval. In the case that the knock magnitude value V is the maximum value, the maximum value can be obtained from the output signal of the peak hold circuit 10-10-6. The step 301 is followed by a step 302 in which a knock decision level Vref is produced as a function of a correction value Kc obtained in the following step 304 and the median value V50 of the distribution of the knock magnitude value V, that is, $Vref = K \times Kc \times V50$ wherein K is constant. In a subsequent step 303, the process is performed for the determination of knock and engine control for elimination of knock, the step 303 will be described hereinafter in detail. Subsequentially, executed is a step 304 for the detection of the knocking condition and the correction of the knock decision level. The step 304 will be hereinafter described in detail. This routine is terminated in response to the execution of the step 304.

Figure 21:
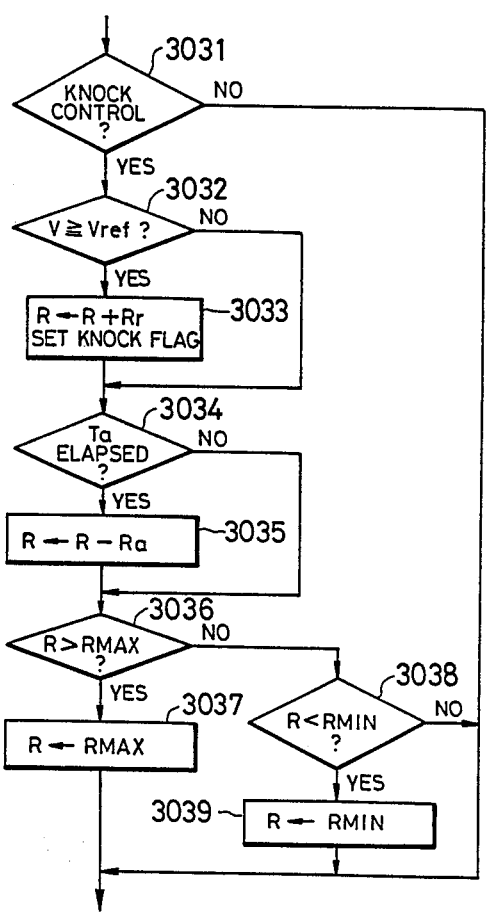
FIG. 21 shows the detail operation executed in the step 303 of the flow chart of FIG. 20.

The execution performed in the step 303 will be described with reference to a flow chart of FIG. 21.

First, a step 3031 is executed to check whether the engine is in the condition to be antiknock-controlled. If the answer of the step 3031 is YES, a step 3032 is executed. On the other hand, if the answer is NO, the control goes to the step 304. In the step 3032, the knock magnitude value V is compared with the knock decision level Vref in order to determine the occurrence of knocking. If the answer is YES indicating that the knocking occurs, the step 3032 is followed by a step 3033. If the answer is NO, the control goes to a step 3034. In the step 3033, the retardation amount R of the ignition timing is increased by Rr and a knock flag is set. The step 3034 is provided for check the elapse of a predetermined time period a. If the answer of the step 3034 is YES, the step 3034 is followed by a step 3035. If the answer is NO, the control jumps to a step 3036. In the step 3035, the retardation amount R is decreased by Ra. On the other hand, in the step 3036, it is checked whether the retardation amount R is greater than the maximum guard value Rmax. If so, a step 3037 is executed to guard the retardation amount R. If not, the step 3036 is followed by a step 3038 in which it is checked that the retardation amount R is smaller than the minimum guard value Rmin. If the answer of the step 3038 is YES, a step 3039 is executed to guard the retardation amount R.

Figure 22:
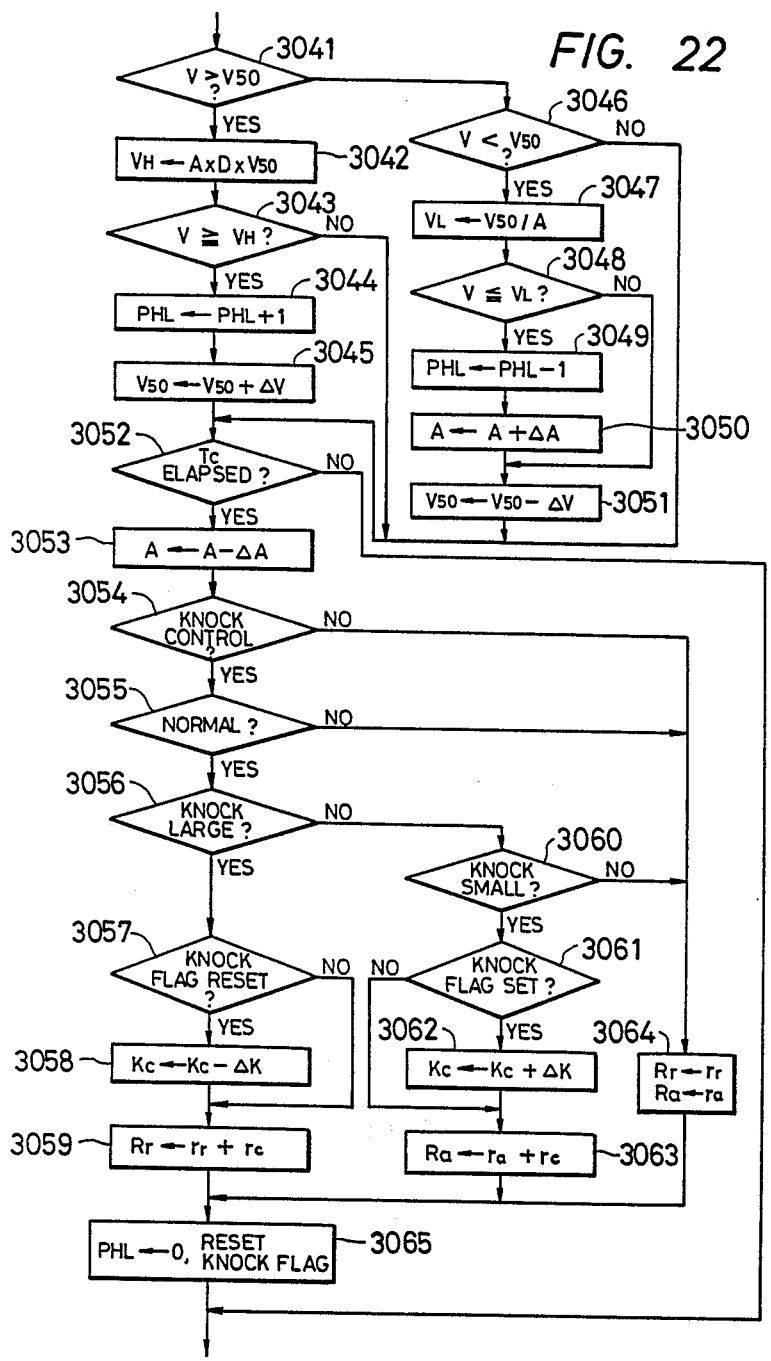
FIG. 22 illustrates the processes executed in the step 304 of the routine of FIG. 20.

Secondly, the process executed in the step 304 of Fig. 20 will be in detail described with reference to the flow chart of FIG. 22.

In a step 3041, the knock magnitude value V obtained at the present time is compared with the median value V50 of the distribution. If the knock magnitude V obtained lately is greater than the median value V50, the step 3041 is followed by a step 3042. If not, a step 3046 is executed after the step 3041. In the step 3042, the upper side threshold value $V_H$ is determined as $V_H = A \times D \times V50$ wherein A is variable and D is a value slightly greater than 1. A step 3043 is executed to check whether $V > V_H$. If $V > V_H$, a subsequent step 3044 is executed, and if not, the control advances to a step 3052. In the step 3044, a counter PHL for knock detection is incremented by one, followed by a step 3045 in which the median value V50 of the distribution is increased by $\Delta V$. On the other hand, in the step 3046, it is checked whether the knock magnitude value V is compared with the median value V50. If $V < V50$, the control advances to a step 3047. If not, the control goes to the step 3052. In the step 3047, the lower side threshold value $V_L$ is determined as $V_L = V50/A$. The step 3047 is followed by a step 3048 in which it is checked whether $V < V_L$. If the answer of the step 3048 is YES, the control advances to a step 3049. If the answer is NO, the control proceeds to a step 3051.

In the step 3049, the counter PHL for knocking condition detection is decremented by one, followed by a step 3050 in which the variable A is increased by a predetermined amount $\Delta A$. In a subsequent step 3051, the median value V50 of the distribution is decreased by $\Delta V$ so that V50 is conveged to the actual median value of the distribution. In the step 3052, it is checked whether a predetermined time period c is elapsed. If the answer of this step 3052 is NO, this routine is terminated. On the other hand, if the answer is YES, the control proceeds to a step 3053 in which the variable A is decreased by the predetermined amcunt $\Delta A$. The frequency that results in $V \leq V_L$ by correcting the the variable A in the steps 3050 and 3053 is one during the predetermined time period c. In a step 3054, it is checked whether the engine is in the condition to be antiknock-controlled. If so, the control advances to a step 3055. If not, the process goes to a step 3064. The step 3055 is provided for checking whether the engine is in the normal condition. If the engine is in the normal condition, the step 3055 is followed by a step 3056. If not, the control goes to the step 3064. In the step 3056, it is checked in accordance with the count value of the knock detection counter whether the knocking condition is excessive. If the answer is YES indicating that PHL>0, the step 3056 is followed by a step 3057. If the answer is NO, the control goes to a step 3060. In the step 3057, it is checked on the basis of the knock flag whether the knock decision is performed during the predetermined time period Tc, that is, when the knock flag is reset, the knock decision is made. If the answer is YES indicating that the knock decision level is exceedingly great, a step 3058 is executed to decrease the correction value Kc by a predetermined value $\Delta K$. Subsequentially, a step 3059 is executed to set the retardation amount Rr per one step to the sum of a basic amount $r_r$ and a correction amount $r_c$, that is, $Rr = R_r + r_c$.

In the step 3060, the decision is made with respect to whether the knocking being extremely few. If the answer is YES indicating that PHL<0, executed is a step 3061. If not, the control proceeds to the step 3064. The step 3061 is provided for checking whether the knock flag is set. If set, it can be decided as the knock decision level is extremely low and therefore a step 3062 follows to increase the correction value Kc by the predetermined value $\Delta V$.

In a subsequent step 3063, as it is possible to quickly advance, the advance amount Ra per one step is set to the sum of a basic amount $r_a$ and the correction amount $r_c$, that is $Ra = r_a + r_c$. In the step 3064, the advance amount Ra is set to the basic amount $r_a$ and the retardation amount Rr is set to the basis amount $r_r$. The steps 3059, 3063 and 3064 are respectively followed by a step 3065 in which the knock detection counter PHL and the knock flag are respectively reset.

Figure 23A:
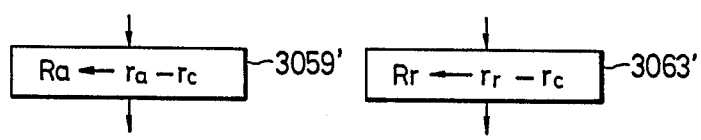
FIGS. 23A and 23B show steps which are executed in place of the steps of the routine of FIG. 22.
Figure 23B:
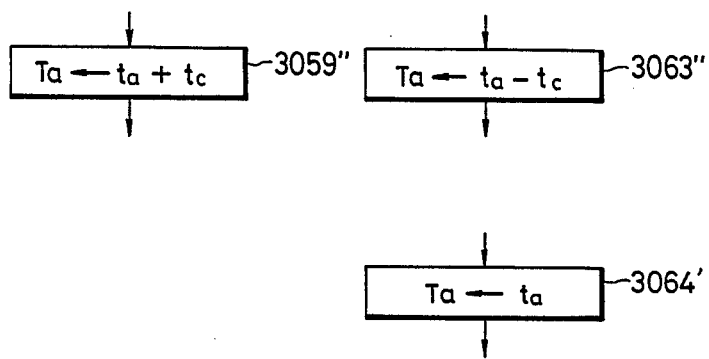

In the above-mentioned programmed arrangement, when the knock is exceedingly great, the retardation amount Rr per one step is increased to quickly retard the ignition timing (step 3059), and when the knock is extremely few, the advance amount Ra per one step is increased to quickly advance the ignition timing (step 3063). However, it is also effective to perform the operation as shown in Figs. 23A and 23B which illustrate only the replaced steps of the routine of FIG. 22. The steps 3059' and 3063' are respectively correspond to the steps 3059 and 3063 of Fig. 22, and the step 3064' corresponds to the step 3064 of Fig. 22. FIG. 23A shows the operation in which the advance amount Ra is decreased to prevent unnecessary advance when the knock is extremely great (step 3059') and the retardation amount Rr is decreased to prevent unnecessary retardation (step 3063'). On the other hand, FIG. 23B shows the operation in which the advancing time a is lengthened by adding a correction time $t_c$ to a basic time ta so that the advancing speed is decreased when the knock is exceedingly great (step 3059") and the advancing time a is shortened so that the advancing speed is increased when the knock is extremely few (step 3063"), and further the advancing time a is set to the basic time when the knocking condition is proper or when the knocking condition cannot detected (step 3064').

It should be understood that foregoing relates to only preferred embodiments of the present invention, and that it is intended to cover all changes and modifications of the embodiments of this invention herein used for the purpose of the disclosure, which do not constitute departures from the spirit and scope of this invention. For example:

(1) In the above-described embodiment, the control of the ignition timing is performed in accordance with the results of knock decision made at every ignition and further in accordance with the average knocking condition, taking into account the transient condition of the engine resulting in the rapid variation of the knocking condition. However, since the average knocking condition can be detected within, for example, 1 sec, it is possible to correct the ignition timing only in accordance with the knocking condition without correcting it at every ignition. In this case, it is not required to set the knock decision level for determining the presence or absence of knock at every cycle. Furthermore, in the case that the knocking condition is detected over a longer time period, it is rendered possible to switch the ignition timing charcteristic in multi-step fashion using a plurality of maps, resulting in a simple anti-knock control system.

(2) Although in the above-described embodiment the ignition timing is controlled for anti-knock control, it is also possible therefor to control knock control elements other than the ignition timing such as air-fuel ratio, intake pressure, EGR, and so on. In this case, it will be appropriate that the knock control element with immediate effect such as ignition timing is controlled in accordance with the results of knock decision obtained at every cycle and the knock control element such as intake pressure affecting the average knock generation is controlled in accordance with the results of detection of the average knocking condition.

(3) With respect to the correction of the control range of the knock control factor, it is also possible to perform only the correction of the control range of the knock control factor in accordance with the average knocking condition, while the knock control factor such as ignition timing is controlled in accordance with the results of knock decision at every cycle. On the other hand, with respect to the correction of the knock decision level, it is not always required to comonly use a signal for knock decision and a knock magnitude value for detection of the knocking condition. Namely, it will be appropriate that the maximum value Vmax is used as the signal for knock decision and the integrated value V is employed as a signal for detection of the average knocking condition. In this case, it is not necessary to directly knock the maximum value Vmax. This means that required is only information indicating whether the maximum value Vmax is greater than the knock decision level, the information being obtained by using a comparator circuit or the like. However, the comon use will be preferred in efficiency.

(4) Although the threshold value $V_L$ and $V_H$ are set symmetrically with respect to the median value M of a distribution (50% point of cumulative distribution), in anticipation of the discrepancy of the value $V_M$ to be converged to the median value M, it may be desired that the threshold values are set so that $V_L = V_M/A$ and $V_H = (A+D) \cdot V_M$ wherein D is offset. The offset D will be set as a positive value. Namely, while converged to the median value M by being increased or decreased by $\Delta V_M$ in accordance with the knock magnitude value V, the value $V_M$ is varried by the same amout with respect to the median value M, and with respect to the logarithmic axis it is intended to be sliped to the lower side. Therefore, it is desired that the offset D is positive. Furthermore, as the compensation for the descrepancy, it is also desired that $V_M$ is converged to a point slightly greater than the cumulative 50% point, for example, cumulative 55% point. In this case, the ratio of increase and decrease in $V_M$ is 55:45.

(5) Althrough in the above-mentioned enbodiment the lower side threshold value $V_L$ is feedback-corrected so that it is equal to the knock generating frequency in the target knocking condition, when the distribution of a knock magnitude value can be approximately estimated or when there is no need to detect the knocking condition with extremely high accuracy, it will be allowed to fixedly set the lower threshold value $V_L$. Therefore, in this case, the upper side threshold value $V_H$ will be allowed to be a fixed value and it is not required to obtain the median value M of the distribution.

(6) Although in the above-mentioned embodiment the average knocking condition is detected by the comparison between the frequency that the knock magnitude value has exceeded the upper side threshold value $V_H$ and the frequency that it has gone below the lower side threshold value $V_L$, the average knocking condition can be detected as follows. Namely, calculated are the cumulative $\alpha\%$ point $L\alpha$ cumulated from the low value, the cumulative $\alpha\%$ point $H\alpha$ cumulated from the high value, and the median value $V_M$ of the distribution, and then it can be checked whether the knocking condition is greater in level than the target knock occuring frequency $\alpha\%$ by determining the relationship in magnitude between $V_M/L\alpha$ and $H\alpha/V_{hd}$ M. In other words, in the knocking condition that the knocking frequency is smaller than $\alpha\%$, the $L\alpha$, $V_M$ and $H\alpha$ are respectively positioned on a straight line formed on the logarithmic normal probability paper. Therefore, in this case, $L\alpha$ and $H\alpha$ are in a geometrical relation to each other with respect to $V_M$, and $V_M/L\alpha$ is approximately equal to $H\alpha/V_H$. On the other hand, in the knocking condition that the knocking frequency is greater than $\alpha\%$, $L\alpha$ and $H\alpha$ are not in the geometrical relation to each other and $H\alpha/V_H$ becomes greater than $V_M/L\alpha$. The method of correction of $H\alpha$ and $L\alpha$, as obvious from the above description, is such that the knock magnitude value V is compared with $L\alpha$ and $H\alpha$ during the predetermined number of cycles. $L\alpha$ is decreased by $\alpha L\alpha$ when the knock magnitude value V exceeds $L\alpha$ at more than predetermined frequency, and is increased by $\alpha L\alpha$ when the number that V exceeds $L\alpha$ is less than the predetermined frequency. At the same time, $H\alpha$ is increased by $\Delta H\alpha$ when V exceeds $H\alpha$ at more than the predetermined frequency, and is decreased by $\Delta H\alpha$ when the number of times that V exceeds $H\alpha$ is less than the predetermined frequency. As a result, $L\alpha$ and $H\alpha$ are converged to desired cumulative points, respectively.

(7) Although the method of not using a logarithmic transformation device has been described above, if it is allowed in terms of cost and so on to use the logarithmic transformation device or software corresponding to the logarithmic transformation device, it is possible, for example, to detect the knocking condition on the basis of the relation in magnitude between the logarithmic transformation value log V of the knock magnitude value and the median value. That is, if the knocking level is smaller, the distribution of the logarithmic transformation value log V results in a normal distribution and the median value of the normal distribution becomes equal to the average value, while it is rendered possible to detect the knocking condition because the average value becomes greater than the median value when the knocking level becomes greater.

(8) If not taking into account the calculation time period and the manufacturing cost of the system, it is possible to detect the knocking condition in terns of a given distribution. Namely, this is achieved by checking the point that data with relatively high values is slipped from a distribution representing non-knocking condition formed only using data with relatively low values.

What is claimed is:

1. A system for controlling knocking in an internal combustion engine, comprising:
   a knock sensor for outputting a signal in response to the vibrations in said engine;
   means for deriving a knock magnitude value from the output signal of said knock sensor generated within a predetermined engine rotational angle at an interval thereby obtaining a plurality of knock magnitude values, said knock magnitude value corresponding to the magnitude of a knock component of said output signal of said knock sensor;
   means for determining a pattern of distribution of said plurality of said knock magnitude values on the basis of the results of comparison between the frequency that said knock magnitude value exceeds an upper threshold value and the frequency that the knock magnitude value goes below a lower threshold value;
   means for detecting a knocking condition of said engine in accordance with the determined distribution pattern; and
   means for controlling said engine to prevent the knocking in accordance with the detected knocking condition.

2. A system for controlling knocking in an internal combustion engine, comprising:
   a knock sensor for outputting a signal in response to the vibrations in said engine;
   means for deriving a knock magnitude value from the output signal of said knock sensor generated within a predetermined engine rotational angle at an interval thereby obtaining a plurality of knock magnitude values, said knock magnitude value corresponding to the magnitude of a knock component of said output signal of said knock sensor;
   means for detecting the presence of knocking by comparing said knock magnitude value with a reference;
   means for determining a pattern of distribution of said plurality of said knock magnitude values on the basis of the results of comparison between the frequency that said knock magnitude value exceeds an upper threshold value and the frequency that the knock magnitude value goes below a lower threshold value;

means for detecting a knocking condition of said engine in accordance with the determined distribution pattern;

means for correcting said reference in accordance with the detected knocking condition; and means for controlling said engine to prevent the knocking in response to the detection of knocking made by comparing said knock magnitude value with the corrected reference.

3. A system for controlling knocking in an internal combustion engine, comprising:

a knock sensor for outputting a signal in response to the vibrations in said engine;

means for deriving a knock magnitude value from the output signal of said knock sensor generated within a predetermined engine rotational angle at an interval thereby obtaining a plurality of knock magnitude values, said knock magnitude value corresponding to the magnitude of a knock component of said output signal of said knock sensor;

means for detecting the presence of knocking by comparing said knock magnitude value with a reference;

means for determining a pattern of distribution of said plurality of said knock magnitude values on the basis of the results of comparison between the frequency that said knock magnitude value exceeds an upper threshold value and the frequency that the knock magnitude value goes below a lower threshold value;

means for detecting a knocking condition of said engine in accordance with the determined distribution pattern;

means for controlling said engine to prevent the knocking in response to the detection of knocking made by comparing said knock magnitude value with the reference; and means for limiting the range of the engine control in accordance with the detected knocking condition.

4. A system for controlling knocking in an internal combustion engine, comprising:

a knock sensor for outputting a signal in response to the vibrations in said engine;

means for deriving a knock magnitude value from the output signal of said knock sensor generated within a predetermined engine rotational angle at an interval thereby obtaining a plurality of knock magnitude values, said knock magnitude value corresponding to the magnitude of a knock component of said output signal of said knock sensor;

means for detecting the presence of knocking by comparing said knock magnitude value with a reference;

means for detecting the frequency of knock generation;

means for determining a condition of knocking on the basis of a pattern of distribution of said plurality of said knock magnitude values;

means for correcting said reference on the basis of the frequency of knock generation and the determined knocking condition; and means for controlling said engine to prevent the knocking in accordance with the frequency of knock generation.

5. A system for controlling knocking in an internal combustion engine, comprising:

a knock sensor for outputting a signal in response to the vibrations in said engine;

means for deriving a knock magnitude value from the output signal of said knock sensor generated within a predetermined engine rotational angle at an interval thereby obtaining a plurality of knock magnitude values, said knock magnitude value corresponding to the magnitude of a knock component of said output signal of said knock sensor;

means for detecting the presence of knocking by comparing said knock magnitude value with a reference;

means for controlling said engine to prevent the knocking in accordance with the detection of the knocking;

means for determining a condition of knocking on the basis of a pattern of distribution of said plurality of said knock magnitude values;

means for correcting a knock control factor in accordance with the determined knocking condition;

means for detecting the variation of the correction amount of said engine control factor; and means for correcting said reference on the basis of the variation of the correction amount and the determined knocking condition.

6. A system as claimed in claim 5, wherein said knock control factor is the ignition timing of said engine.

7. An apparatus for detecting knocking in an internal combustion engine, comprising:

a knock sensor for outputting a signal in response to the vibrations in said engine;

means for deriving a knock magnitude value from output signal of said knock sensor generated within a predetermined engine rotational angle at an interval thereby obtaining a plurality of knock magnitude values, said knock magnitude value corresponding to the magnitude of a knock component of said output signal of said knock sensor;

means for determining a pattern of distribution of said plurality of said knock magnitude values on the basis of the results of comparison between the frequency that said knock magnitude value exceeds an upper threshold value and the frequency that the knock magnitude value goes below a lower threshold value; and means for detecting a knocking condition of said engine in accordance with the determined distribution pattern.

8. An apparatus as claimed in claim 7, wherein said knock magnitude value is a maximum value of said knock sensor signal produced within the predetermined engine rotational angle.

9. An apparatus as claimed in claim 7, wherein said knock magnitude value is an integrated value obtained by rectifying and integrating the output signal of said knock sensor within the predetermined engine rotational angle.

10. An apparatus as claimed in claim 7, wherein said knock magnitude value is the number or integrated value of pulse trains obtained by comparing the output signal of said knock sensor.

11. An apparatus as claimed in claim 7, wherein said knock magnitude value is a root-mean-square value of the output signal of said knock sensor.

12. An apparatus as claimed in claim 7, wherein said lower threshold value is a value corresponding to a cumulative point lower than the cumulative 50% point of a cumulative distribution and said upper threshold value is a value corresponding to a cumulative point higher than the cululative 50% point of the cululative distribution.

13. An apparatus as claimed in claim 12, further comprising means for estimating a value corresponding to the cumulative 50% point by successively comparing said knock magnitude value with a basic value and increasing or decreasing said basic value by a predetermined value in accordance with the results of the comparison.

14. An apparatus as claimed in claim 13, wherein said lower and upper threshold values $V_L$ and $V_H$ are set with respect to the estimated value $V_M$ so that $V_M/V_L$ is substantially equal to $V_H/V_M$.

15. An apparatus as claimed in claim 13, wherein said lower and upper threshold values $V_L$ and $V_H$ are set with respect to the estimated value $V_M$ so that $V_M/V_L$ is slightly smaller than $V_H/V_M$.

16. An apparatus as claimed in claim 13, wherein said lower threshold value $V_L$ and said upper threshold value $V_H$ are set with respect to said estimated value $V_M$ so that $V_L=V_M/A$ and $V_H=V_M(A+D)$ where A is a geometrical value and D is an offset value.

17. An apparatus as claimed in claim 13, wherein said lower threshold value $V_L$ and said upper threshold value $V_H$ are set with respect to said estimated value $V_M$ so that $V_L=V_M/A$ and $V_H=V_M\cdot A$ where A is a geometrical value.

18. An apparatus as claimed in claim 17, wherein said knock magnitude value is compared with said lower threshold value and said geometrical value A is varried in accordance with the results of the comparison.

19. An apparatus as claimed in claim 18, wherein said geometrical value A is increased by a predetermined value when a frequency that said knock magnitude value goes below said lower threshold value $V_L$ during a predetermined number of cycles is greater than a predetermined frequency and is decreased by the predetermined value when the frequency is smaller than the predetermined frequency so that a probability that said magnitude value goes below said lower threshold value is substantially equal to a desired probability.

20. An apparatus as claimed in claim 19, wherein said predetermined number of cycles is varried in accordance with the variation of engine operating condition so that the probability that said knock magnitude value goes below said lower threshold value is varried in accordance with the engine operating condition.

21. An apparatus as claimed in claim 20, wherein said predetermined number of cycles is greater as the rotational speed of said engine increases so that the probability that said knock magnitude value goes below said lower threshold value is decreased in response to increase in the engine rotational speed.

* * * * *